(12) United States Patent
Hatano et al.

(10) Patent No.: US 8,465,817 B2
(45) Date of Patent: Jun. 18, 2013

(54) POLYESTER CONTAINER

(75) Inventors: Yasushi Hatano, Yokohama (JP);
Tsutomu Iwasaki, Yokohama (JP);
Masahito Kogure, Yokohama (JP);
Hideo Kawasaki, Yokohama (JP); Hisao Iwamotoi, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 1469 days.

(21) Appl. No.: 10/577,371

(22) PCT Filed: Nov. 4, 2004

(86) PCT No.: PCT/JP2004/016345
§ 371 (c)(1),
(2), (4) Date: Apr. 28, 2006

(87) PCT Pub. No.: WO2005/042373
PCT Pub. Date: May 12, 2005

(65) Prior Publication Data
US 2007/0082151 A1    Apr. 12, 2007

(30) Foreign Application Priority Data
Nov. 4, 2003    (JP) ................................ 2003-374497

(51) Int. Cl.
*B32B 1/02* (2006.01)
*B65D 8/04* (2006.01)
*B65D 90/02* (2006.01)
*B65D 6/40* (2006.01)
*B65D 1/40* (2006.01)

(52) U.S. Cl.
USPC ..... 428/35.7; 428/34.1; 428/36.6; 428/36.92; 220/660; 220/661; 220/669; 220/675; 220/729

(58) Field of Classification Search
USPC ... 428/34.1, 35.7, 36.6, 36.7, 36.92; 220/600, 220/604, 608, 626, 660, 661, 669, 675, 729
See application file for complete search history.

(56) References Cited

U.S. PATENT DOCUMENTS

| 5,039,001 | A | * | 8/1991 | Kinigakis et al. | 229/120 |
| 5,118,002 | A | | 6/1992 | Sugiyama et al. | |
| 5,240,133 | A | | 8/1993 | Thomas, Jr. | |
| 5,607,709 | A | * | 3/1997 | Fritz et al. | 426/106 |
| 6,889,825 | B2 | * | 5/2005 | Ichikawa et al. | 206/5.1 |

FOREIGN PATENT DOCUMENTS

| JP | S60-34323 | 2/1985 |
| JP | 62-28355 | 2/1987 |
| JP | 02-258577 | 10/1990 |
| JP | H04-253656 | 9/1992 |

(Continued)

*Primary Examiner* — Walter B Aughenbaugh
(74) *Attorney, Agent, or Firm* — Manabu Kanesaka

(57) ABSTRACT

A polyester container furnished with a flange part having mechanical strength, transparency, and heat resistance through orientational crystallization, which polyester container exhibits low-temperature heat sealability, is provided by forming a projecting portion at an upper surface of the crystallized flange part, the projecting portion at at least a heat-sealing-face constituting region rendered amorphous or of low crystallinity. Further, in order to suppress the unevenness of the strength of sealing with a cover member and stably attain the high sealability, the projecting portion is deformed at the time of heat sealing with the cover member so as to form a resin piece protruding toward the interior of the container while being substantially appressed against the upper surface of an opening rim part. The formed resin piece couples with a sealant layer of the cover member.

7 Claims, 23 Drawing Sheets

FOREIGN PATENT DOCUMENTS

| | | |
|---|---|---|
| JP | 6-44767 | 6/1994 |
| JP | 09-099933 | 4/1997 |
| JP | H10-119936 | 5/1998 |
| JP | H10-167326 | 6/1998 |
| JP | 11-292140 | 10/1999 |
| JP | 2000-15691 | 1/2000 |
| JP | 2004-058602 | 2/2004 |
| WO | WO 92/15498 | 9/1992 |
| WO | WO 96/04186 | 2/1996 |
| WO | WO 97/27050 | 7/1997 |

* cited by examiner

5: PROJECTING PORTION

51 : RESIN PIECE

133: CAVITY  132

132  133

133  132

133  132

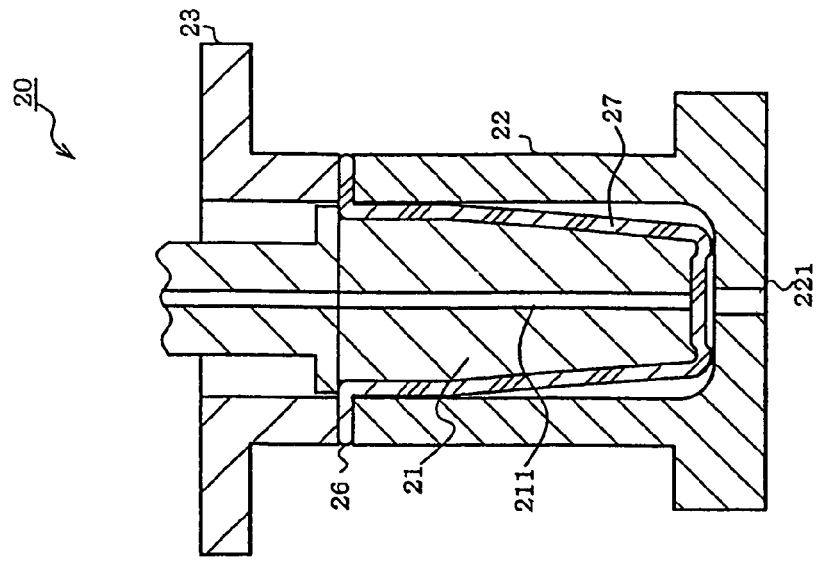
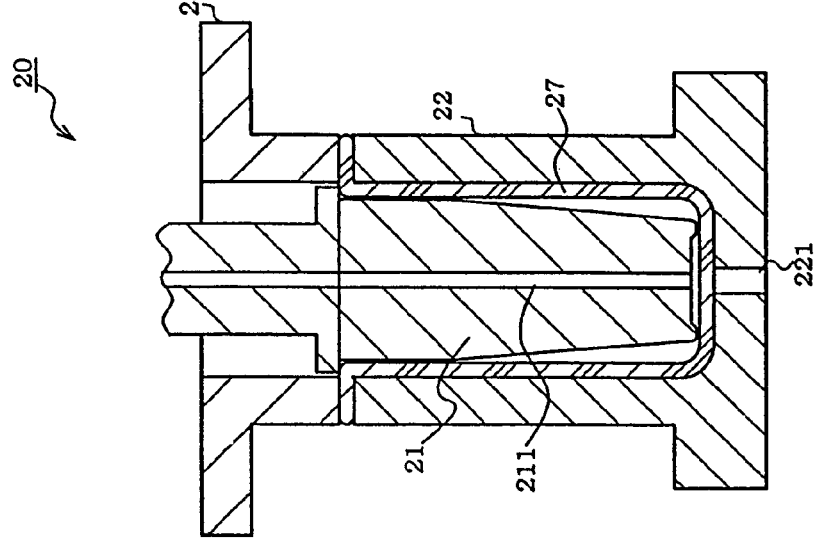
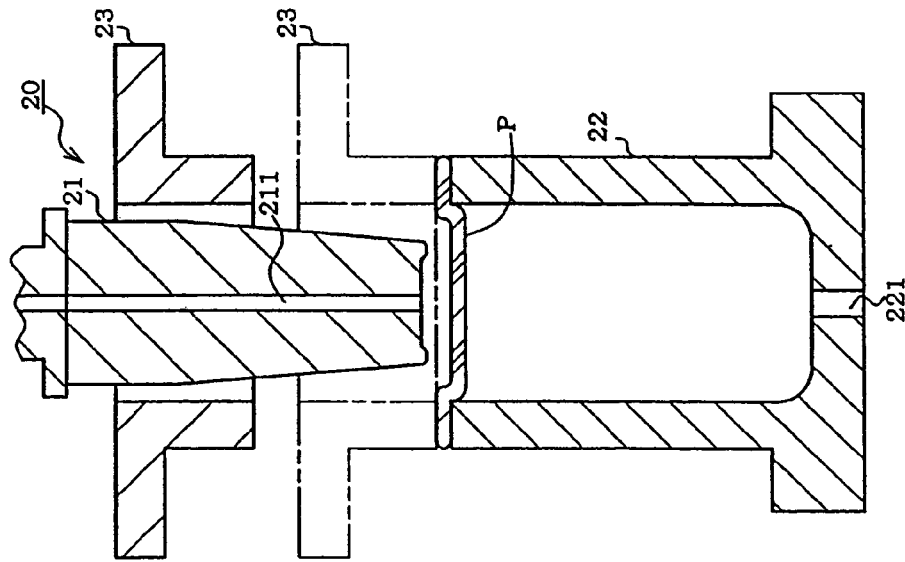

POLYESTER CONTAINER

TECHNICAL FIELD

The present invention relates to a polyester container, more particularly to a polyester container which is excellent in rigidity in a portion along a rim part of an opening heat-sealed with a cover member, low-temperature heat sealability, and easy sealing properties and which is capable of suppressing the unevenness of sealing strength with respect to the cover member to obtain the high sealability stably.

BACKGROUND ART

Thermoplastic resin containers are excellent in shock resistance and the like and is easy to handle, and therefore, the increase of a demand for the container is also expected in the future. Especially, since containers made of a thermoplastic polyester resin such as polyethylene terephthalate are excellent in transparency, flavor properties, and heat resistance in addition to shock resistance, and they have gas barrier properties. Accordingly, these containers are broadly used as various kinds of containers.

As an example of such polyester containers, there is a container obtained by thermally molding an oriented or a non-oriented polyester resin sheet into a predetermined container shape such as a cup or tray shape. In general, after this type of container is packed with contents, an opening of the container is heat-sealed with a cover member.

Moreover, examples of a method for manufacturing this type of container include a method of drawing a softened polyethylene terephthalate sheet using a male mold plug to bring the sheet into contact by a female mold heated at a temperature which is not less than a glass transition point of the sheet; heat-setting the sheet; and allowing the sheet to shrink back on the male plug to cool and manufacture the container (see, e.g., Patent Document 1).

It is known that the thermoplastic polyester resin is subjected to a drawing step and a heat-setting step during molding to orientationally or thermally crystallize the resin, so that mechanical strength, transparency, and heat resistance are improved.

However, in a case where a portion along an opening rim part which is heat-sealed with the cover member is uniaxially oriented and crystallized in a diametric direction, transparency and heat resistance are obtained. However, this opening rim part is vulnerable to tension in a peripheral direction. When the container is dropped in a lateral direction, there is a problem that this opening rim part easily breaks, and sealability cannot be secured.

Moreover, when the polyester resin is orientationally or thermally crystallized, the heat sealability drops. Therefore, there is a problem that a heat sealing temperature needs to be remarkably raised, and a material to be used in the cover member is limited. The heat sealing time also needs to be lengthened, and there is a problem that productivity degrades during filling and sealing. Furthermore, since heat sealing strength itself is not improved, a heat seal portion might be peeled owing to dropping impact, and there is a problem that the heat sealing becomes difficult.

As a method of solving these problems, for example, in Patent Document 2, there is provided a method of irradiating the heat seal portion of the container with a laser beam to lower the crystallinity of the heat seal portion and to accordingly impart the heat-sealability thereto. According to this method, there is an effect of orientational crystallization or thermal crystallization, and the heat sealing is also possible.

Moreover, in this type of container, there is a demand for high sealing strength in a heat seal portion such that the cover member is not peeled even by a heating sterilization treatment or an inner pressure rise due to the dropping impact. For example, in Patent Document 3, a heat-sealed container is proposed in which a protruding portion is formed on a sealing face, and this protruding portion is integrated with the cover member in a case where a flange portion having the upward curved sealing face is heat-sealed with the cover member.

In the heat-sealed container constituted in this manner, after a root portion of the protruding portion is broken, the peeling of the sealing face proceeds. Therefore, initial seal breaking strength is improved up to the breaking strength of the protruding portion, and high sealing strength is realized in the heat seal portion.

On the other hand, the container proposed in Patent Document 3 is unfavorable from a viewpoint of easy opening properties of the cover member, because the protruding portion is also formed on an outer peripheral side of the sealing face. Therefore, various containers are also proposed in which, for example, a projecting portion having a asymmetric sectional shape is formed on a flange part, so that a resin lump piece functioning in the same manner as in the protruding portion in Patent Document 1 is selectively formed on an inner peripheral side of the sealing face during the heat sealing (e.g., Patent Documents 4, 5, 6, etc.).

In these containers, the easy opening properties are secured against a force to peel (open) the cover member inwards from the exterior of the container, so that the container is easily opened by a manpower owing to peeling of an interface between a sealant layer of the cover member and the flange part or cohesion failure of the sealant layer. On the other hand, the resin lump piece rises to prevent the heat seal portion from being peeled against a peeling force exerted outwards from the interior of the container, whereby high sealing strength is realized.

Patent Document 1: Japanese Patent Application Laid-Open No. 58-89319;
Patent Document 2: Japanese Patent Application Laid-Open No. 2-258577;
Patent Document 3: Japanese Patent Application Laid-Open No. 62-28355;
Patent Document 4: Japanese Patent Application Laid-Open No. 9-99933;
Patent Document 5: Japanese Patent Application Laid-Open No. 11-292140; and
Patent Document 6: Japanese Utility Model Application Laid-Open No. 6-44767.

DISCLOSURE OF THE INVENTION

Problem to be Solved by the Invention

However, in the method disclosed in Patent Document 2, there is a problem that a step of irradiation with the laser beam is necessary after manufacturing the container, and a new facility needs to be introduced.

Moreover, in a case where the container manufactured by the method disclosed in Patent Document 2 is heat-sealed, there is a problem that it is necessary to position a lowly crystallized portion to which the heat sealability has been imparted and a sealing head with a high precision.

That is, there will be described an example of a container including the flange part for heat sealing in the opening rim part. In a case where a lowly crystallized portion 220 is formed on the same plane as that of the flange part, when the container is heat-sealed using a sealing head 201 having a flat abutment portion as shown in FIG. 24(a), air cannot escape between a flange part 211 and a seal material 212, and remains as bubbles 213 between the flange part 211 and the seal material 212, thereby lowering the sealability. Especially, when liquid contents stick to the flange part 211, that is, liquefied matters are bitten during the sealing, vapor is generated between the flange part and the seal material, and a sealing defect is generated.

To solve the problem, as shown in FIG. 24(b), the sealing head 201 having an arched abutment portion is positioned right above the lowly crystallized portion 220, and the heat-sealing is performed while releasing air between the flange part 211 and the seal material 212 and vapor during the bite sealing.

For this purpose, a special sealing head has to be prepared, and the lowly crystallized portion and the sealing head need to be positioned with a high precision.

Moreover, in these priority arts disclosed in Patent Documents 3 to 6, a shape or a size of the protruding portion or the resin lump piece cannot be controlled, and unevenness is easily generated in the shape or the size depending on heat sealing conditions, environment temperature and the like. Therefore, there is a problem that stable sealing strength cannot be secured, and the unevenness of the sealing strength is generated in not only each container but also each portion of the heat seal portion of the container. The sealing strength largely influences the sealability or openability of the container. There is a problem that the unevenness is also generated in the sealability or the openability of the container with the unevenness of the sealing strength.

Furthermore, when such unevenness as to weaken the sealing strength is large, in order to prevent seal leakage, the heat sealing conditions have to be set assuming a case where the sealing strength becomes lowest. There is a problem that the sealing strength becomes excessively higher, and the openability is sacrificed.

As described above, in the technologies disclosed in Patent Documents 3 to 6, there is still a room for improvement in order to stably supply a sealed container having the high sealability.

The present invention has been developed in view of the above problems, and an object is to provide a polyester container, a method for manufacturing the same, and a method of sealing a polyester container in which an opening rim part of the polyester container constituted by crystallization has rigidity and heat resistance as well as low-temperature heat sealability and easy sealing properties and in which the unevenness of the sealing strength with respect to a cover member is suppressed, and the high seal ability can be stably obtained.

Means for Solving the Problem

To solve these problems, as a result of intensive investigations, the present inventors have found that an amorphous or a lowly crystallized projecting portion is disposed on an upper surface of a part along a rim of an opening in a crystallized polyester container to thereby impart rigidity and heat resistance to this opening rim part and impart low-temperature heat sealability and easy sealing properties to the projecting portion. Furthermore, it has been found that the projecting portion is deformed during heat sealing of a cover member to the opening rim part, and a resin piece protruding toward the interior of the container is formed in a state where the piece member is substantially appressed against the upper surface of the opening rim part, whereby the unevenness of the sealing strength is suppressed. In consequence, the present invention has been completed.

That is, in a polyester container, a projecting portion is disposed on an upper surface of a crystallized opening rim part, and at least a portion of the projecting portion which becomes a heat-sealing-face is an amorphous portion or a lowly crystallized portion.

When the opening rim part is crystallized in this manner and the projecting portion whose at least the heat-sealing-face is the amorphous portion or the lowly crystallized portion is disposed on the upper surface of the opening rim part, the opening rim part can hold rigidity, and low-temperature heat sealability as well as heat sealing strength can be improved.

Moreover, crystallinity of the crystallized opening rim part is preferably set to 20% or more, and crystallinity of the amorphous portion or the lowly crystallized portion of the projecting portion is preferably in a range of 0 to less than 20%, in order to sufficiently secure mechanical strength, heat resistance, and heat sealability of the opening rim part.

In the present invention, the opening rim part is preferably provided with an amorphous portion or a lowly crystallized portion.

According to this constitution, shock resistance, especially resistance to dropping can be improved.

Moreover, a thickness of the projecting portion is preferably in a range of 0.1 to 2.0 mm. This projecting portion is preferably disposed in the center and/or an outer peripheral side of the upper surface of the opening rim part, or disposed ranging from the center to the outer peripheral side.

When the thickness of the projecting portion is smaller than 0.1 mm, a trouble is sometimes generated during the sealing. When the thickness is larger than 2.0 mm, the projecting portion excessively protrudes from the face of the opening rim part. When the projecting portion is disposed on an inner peripheral side of the face of the opening rim part, a flange part formed in the opening rim part is insufficiently grasped in a drawing step for molding a container main body, and it is unfavorable that a part of the flange part is easily drawn into the container main body in a method for manufacturing the polyester container as shown in FIGS. 16 and 10 described later.

In the polyester container of the present invention, at least a trunk portion of the container is preferably orientationally or thermally crystallized. Accordingly, there is provided a container in which the heat resistance or the mechanical strength is also imparted to the container trunk portion and which is excellent in self-supporting properties and easy holding properties.

Moreover, the polyester container of the present invention can be formed into a constitution in which the opening rim part has a flange part, and the projecting portion is disposed on the upper surface of the flange part. Even when the opening rim part has the flange part to be heat-sealed with the cover member, rigidity is imparted to such flange part, while low-temperature heat sealability as well as heat sealing strength can be improved.

The polyester container of the present invention further comprises a resin piece formed so as to protrude toward the interior of the container in a state where the resin piece is substantially appressed against the upper surface of the opening rim part, the resin piece being formed by melting and pressing the projecting portion to deform it during heat sealing of a cover member having a sealant layer on an inner face thereof while the projecting portion is disposed to face the sealant layer. The resin piece is bonded to the sealant layer of the cover member.

According to such constitution, it is possible to regulate a shape or a size of the resin piece bonded to the sealant layer of the cover member so as to improve the sealing strength. Accordingly, there is stably obtained a sealed container which has the high sealability and in which the sealing strength from the interior of the container is improved, the unevenness of the sealing strength is suppressed, and the unevenness of peeling openability from the exterior of the container is suppressed.

Moreover, the upper surface of the opening rim part on an external side of the container from the projecting portion is formed below the upper surface of the opening rim part on an internal side of the container from the projecting portion, and a resin lump may be formed on a container external side of the projecting portion which is molten, pressed and thus deformed during the heat sealing of the cover member to the container main body. In this case, the opening rim part is preferably bonded to the sealant layer of the cover member with heat sealing strength which enables easy opening.

According to such constitution, the resin lump formed on an external side of the container does not rise as the resin piece protruded toward the interior of the container. When the bonding of the sealant layer of the cover member to the opening rim part is appropriately adjusted to the heat sealing strength which enables easy opening, easy peel opening properties are secured from the exterior of the container. The sealed container has both the high sealability and the easy opening properties.

Furthermore, when the resin piece is formed into a tapered shape, a root of the resin piece can be formed to be thick and rigid, and a container internal side portion of the tapered resin piece can be more securely raised together with the cover member. There are improved an effect of improving the sealing strength from the interior of the container, and an effect of suppressing the unevenness of the sealing strength. Furthermore, since the resin piece easily rises, the bonding between the sealant layer of the cover member and the resin piece may be weak, and it is possible to improve the easy peel opening properties from the exterior of the container while retaining the high sealability.

The polyester container of the present invention can be formed into a constitution in which the upper surface of the opening rim part has a tapered face inclined obliquely upwards from a base portion of the projecting portion to the interior of the container.

According to such constitution, during the heat sealing of the cover member, the projecting portion molten and pressed by the heat sealing head is deformed along the tapered face in a state where the projecting portion is substantially appressed against the upper surface of the opening rim part, and the resin piece protruding toward the interior of the container in the tapered form can be formed while the shape or the size of the piece is regulated. Therefore, only by heat-sealing the present container with the cover member, it is possible to stably obtain the sealed container which has the high sealability and in which the sealing strength from the interior of the container is improved and the unevenness of the sealing strength is suppressed.

The polyester container of the present invention can be formed into a constitution in which the upper surface of the opening rim part on the external side of the container from the projecting portion is formed below the upper surface of the opening rim part on the internal side of the container from the projecting portion.

According to such constitution, the resin lump is formed on the container external side of the projecting portion which is molten, pressed and thus deformed during the heat sealing of the cover member. This resin lump does not rise like the resin piece formed so as to protrude toward the interior of the container. When the bonding of the sealant layer of the cover member to the resin lump is appropriately adjusted to the heat sealing strength which enables easy opening, it is possible to obtain the sealed container having both the high sealability and the easy peel opening properties from the exterior of the container.

As the polyester container of the present invention, there is provided a polyester container whose opening rim part is heat-sealed with a cover member having a sealant layer made of a polyester resin having a melting point of 110° C. to 225° C.

Moreover, this sealant layer is preferably made of a polybutylene-terephthalate (PBT)-based resin, and the heat-sealing of the layer can be carried out at a usual heat sealing temperature, for example, 250° C. or less. Since a crystallization speed is high, a solidifying speed after the heat sealing is high. The appropriate heat resistance and low-temperature heat sealability can both be established, and biting sealability or the like is excellent.

Furthermore, in a method of sealing the polyester container according to the present invention, a projecting portion is disposed to face a sealant layer, and a seal portion is heated and pressurized with a sealing head to heat-seal the container with the cover member having the sealant layer on an inner face thereof on an upper surface of an opening rim part. The method comprises the steps of melting and pressing the projecting portion by the sealing head to deform the projecting portion along the upper surface of the opening rim part in a state where the projecting portion is substantially appressed against the upper surface of the opening rim part, thereby forming a resin piece protruding toward the interior of the container; and bonding the resin piece to a sealant layer of the cover member.

According to such method, the projecting portion is deformed along the upper surface of the opening rim part in a state where the portion is substantially appressed against the upper surface of the opening rim part. Therefore, a shape or a size of the resin piece to be formed can be regulated. Accordingly, it is possible to stably manufacture a sealed container having the high sealability, in which the sealing strength from the interior of the container is improved, the unevenness of the sealing strength is suppressed, and there is the less unevenness of the easy peel opening properties from the exterior of the container.

Moreover, the method of sealing the polyester container of the present invention further comprises the steps of forming the upper surface of the opening rim part on an external side of the container from the projecting portion below the upper surface of the opening rim part on an internal side of the container from the projecting portion; and forming a resin lump on the container external side of the projecting portion which is molten, pressed and thus deformed in a case where the container main body is heat-sealed with the cover member. In this case, the opening rim part is preferably bonded to the sealant layer of the cover member with heat sealing strength which enables easy opening.

According to such method, the resin lump formed on the external side of the container does not rise like the resin piece formed so as to protrude toward the interior of the container. When the bonding of the sealant layer of the cover member to the opening rim part is appropriately adjusted to the heat sealing strength which enables easy opening, the easy opening from the exterior of the container is secured. It is possible to obtain a sealed container having both the high sealability and the easy opening.

Furthermore, the method of sealing the polyester container of the present invention comprises the step of cutting the container external side of the projecting portion to control a size of the resin lump.

According to such method, the easy opening of the obtained sealed container can be appropriately adjusted by controlling the shape or the size of the formed resin lump.

Additionally, the method of sealing the polyester container of the present invention further comprises the steps of disposing a tapered face inclined obliquely upwards from a base portion of the projecting portion to the interior of the container; and deforming the projecting portion molten and pressed by the sealing head along the tapered face to form the resin piece into a tapered shape.

According to such method, the projecting portion is deformed along the tapered face in a state where the projecting portion is substantially appressed against the upper surface of the opening rim part. Accordingly, it is possible to form the resin piece protruding in a tapered state toward the interior of the container while regulating the shape or the size of the projecting portion. When a root of the resin piece is formed to be thick, and the piece is tapered toward a pointed end of the piece, the resin piece can be raised together with the cover member more securely. This improves an effect of improving the sealing strength from the interior of the container and an effect of suppressing the unevenness of the sealing strength. Furthermore, since the resin piece easily rises, the bonding between the sealant layer of the cover member and the resin piece may weaken, and the high sealability is obtained. Moreover, the easy opening can be improved.

Moreover, the method of sealing the polyester container of the present invention may further comprise the step of forming a stepped portion in the sealing head to control the shape or the size of the resin piece by the stepped portion.

According to such method, even when heat sealing conditions and the like slightly vary every container or in the container, a thickness or a protruding length of the resin piece can be regulated, and the resin piece can be formed with satisfactory shape reproducibility.

A method for manufacturing a polyester container of the present invention comprises the steps of supporting an undersurface of a flange part disposed in an opening rim part by a female mold; forming a projecting portion on an upper surface of the flange part by use of a clamp mold having a groove portion in a molding face; crystallizing the flange part by orientational crystallization and thermal crystallization using the clamp mold and the female mold; and subjecting the projecting portion to an amorphous treatment or a low crystallization treatment in the groove portion of the clamp mold.

That is, fluidity of the flange part is oriented by a mold closing force between the female mold and the clamp mold. Moreover, crystallinity is raised. Since a change of thickness of the projecting portion is small owing to the groove portion of the clamp mold, the fluidity is suppressed, an orientation degree does not increase, and a non-orientation or low orientation state is achieved. An amorphous or a lowly crystallized projecting portion is formed on the crystallized flange part, and heat sealing is possible in this projecting portion.

Moreover, a polyester resin sheet heated at a temperature which is not less than a glass transition point (Tg), or the flange part of a molded article for container intermediate is grasped by such mold. Accordingly, it is possible to mold the crystallized flange part and the amorphous or the lowly crystallized projecting portion at the same time.

Furthermore, a depth H of the groove portion of the clamp mold is preferably in a range of 0.1 to 0.35 mm. In this case, the projecting portion is securely brought into the non-orientation or low orientation state. Moreover, the flange part right under the projecting portion is orientationally or thermally crystallized.

In addition, as to a temperature of a mold, a temperature of the clamp mold is preferably set to 70 to 130° C., and a temperature of the female mold is set to 130 to 200° C.

Accordingly, it is possible to manufacture a container in which the flange part is crystallized, and the projecting portion of the flange part is amorphous or has the low crystallinity.

Another method for manufacturing a polyester container of the present invention comprises the steps of molding an article for container intermediate or a container article having a projecting portion on an upper surface of an opening rim part by injection molding or compression molding; thermally crystallizing the opening rim part; and subjecting the projecting portion disposed on the upper surface of the opening rim part to an amorphous treatment or a low crystallization treatment.

In this case, the amorphous treatment or the low crystallization treatment of the projecting portion is performed by cooling the projecting portion and/or the vicinity of the projecting portion, or heating, melting, and then quenching the projecting portion.

Effect of the Invention

According to the present invention, there can be provided a polyester container having mechanical strength such as rigidity, and the heat resistance of an opening rim part which is heat-sealed with a cover member, and having the low-temperature heat sealability and easy sealing properties, and a method for manufacturing the polyester container can be provided.

Especially, transparency can be imparted to the opening rim part by performing orientational crystallization during the crystallizing of the opening rim part, and the whole polyester container can keep the transparency.

Furthermore, the projecting portion formed on the upper surface of the opening rim part is deformed during the heat sealing of the cover member, and the resin piece is formed in a state where the projecting portion is substantially appressed against the upper surface of the opening rim part. Accordingly, the resin piece can be formed with satisfactory shape reproducibility while regulating the shape or the size of the piece, and this resin piece is bonded to the sealant layer of the cover member. Accordingly, it is possible to stably obtain a sealed container having the high sealability, in which the sealing strength from the interior of the container is improved, and there is the less unevenness of the sealing strength and openability.

BRIEF DESCRIPTION OF THE DRAWINGS

FIG. 19 is a diagram showing the second embodiment of the method for manufacturing the polyester container according to the present invention;

Figure 1:
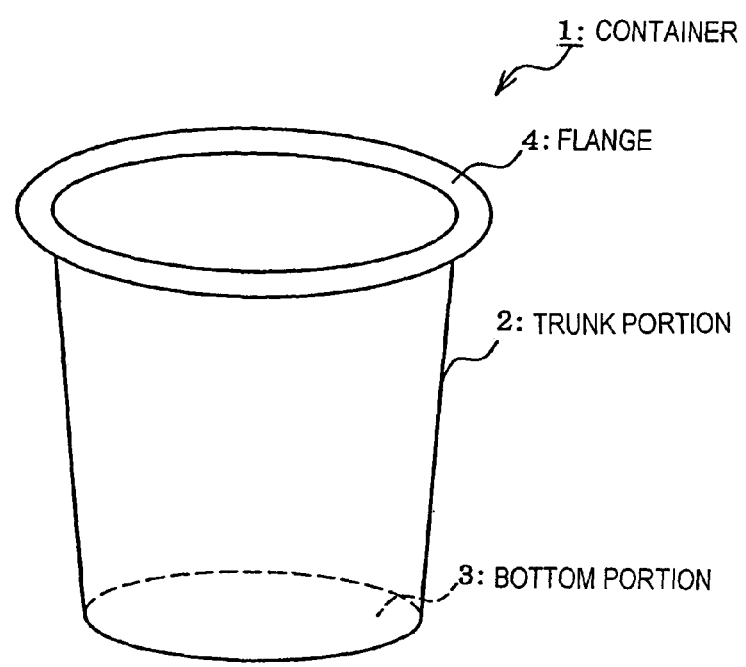
FIG. 1 is a diagram showing an example of a polyester container.

| Description of Reference Numerals | |
|---|---|
| 1 | cup-like polyester-container |
| 2 | trunk portion |
| 3 | bottom portion |
| 4 | flange part (opening rim part) |
| 41 | upper surface |
| 5 | projecting portion |
| 51, 52, 53, 55, 57 | resin piece |
| 54, 56 | resin lump |
| 6 | cover member |
| 61 | sealant layer |

| Description of Reference Numerals | |
|---|---|
| G | gap between upper surface of flange part (opening rim part) on internal side from projecting portion and upper surface of flange part (opening rim part) on external side from projecting portion |
| 10, 20, 30 | molding device |
| 11, 21, 31 | male mold plug |
| 111, 211 | gas passage |
| 12, 22, 32 | female mold |
| 121, 221 | gas passage |
| 122 | flange part grasping face |
| 13, 23 | clamp mold |
| 131 | inner face |
| 132 | flange part grasping face |
| 133 | cavity |
| 16 | polyester resin sheet |
| 17 | drawing part |
| P | preform |
| C | molded container article |

BEST MODE FOR CARRYING OUT THE INVENTION

There will be described hereinafter embodiments of a polyester container and a method for manufacturing the container. It is to be noted that the present invention is not limited to these embodiments.

[Polyester Container]

First, there will be described a polyester container of the present invention.

Figure 2:
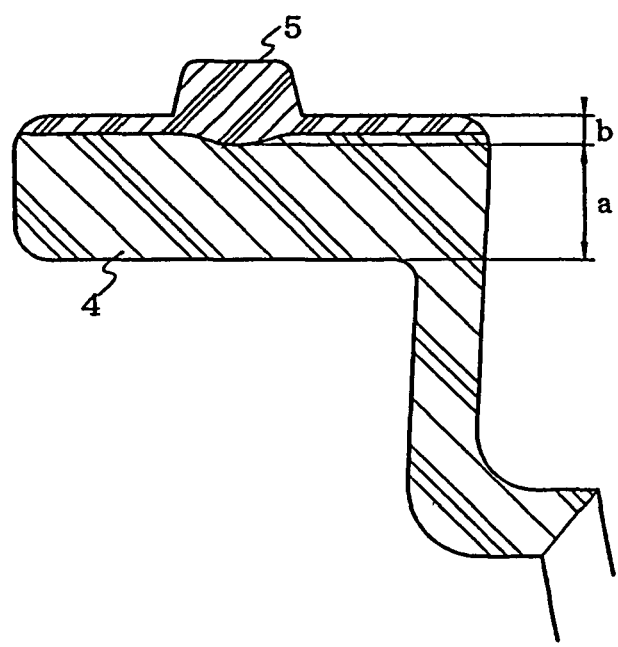
FIG. 2 is an enlarged view of a flange part and a projecting portion of the polyester container according to the present invention.

FIGS. 1 and 2 are diagrams showing one embodiment of the polyester container according to the present invention.

FIG. 1 is a diagram showing an example of the polyester container of the present embodiment.

This container is a cup-like polyester container 1, and includes a bottom portion 3 connected to a lower end of a trunk portion 2, and an opening rim part connected to an upper end of the trunk portion 2 includes a flange part 4 for heat sealing.

FIG. 2 is an enlarged view of the flange part 4 of the polyester container 1 and a projecting portion 5 for the heat sealing of a cover member.

The flange part 4 of FIG. 2 is provided with the amorphous or the lowly crystallized projecting portion 5 from the center of an upper surface of the flange part 4 to an outer peripheral side. Moreover, the flange part 4 is crystallized by orientational crystallization and thermal crystallization during molding. On the other hand, in the projecting portion 5, the orientational crystallization and the thermal crystallization are inhibited in contrast to the flange part 4, and the projecting portion 5 is brought into a non-orientational or low-orientational state.

As a result, while rigidity is imparted to the flange part 4, low-temperature heat sealability as well as heat sealing strength can be improved.

The flange part 4 of the polyester container has a crystallinity of 20% or more, and the whole flange part 4 does not have to be orientational crystallized and the thermal crystallized.

As to the projecting portion 5 disposed on the upper surface of the flange part 4, at least a portion constituting a heat-sealing-face may be an amorphous portion or a lowly crystallized portion, and the whole projecting portion 5 does not have to be an amorphous portion or a lowly crystallized portion.

Moreover, a ratio of the portion having a crystallinity of 20% or more in the flange part 4 differs with a shape or the thickness of the flange part 4, but a ratio of a lowly crystallized region excluding the projecting portion 5 is preferably 0% to 60%, because both the heat resistance and the mechanical strength are established.

That is, assuming that the crystallized portion of portion having a crystallinity which is less than 20% is (b), as shown in FIG. 2, a ratio (%) of the lowly crystallized region of the flange part 4 is represented by a ratio (%) of the lowly crystallized region (b) in the flange part 4=(b)/[(a)+(b)]×100.

In a case where the crystallinity degrees of the flange part 4 and the projecting portion 5 are set in this manner, even when high-temperature sealing is performed, the flange part 4 is not deformed, and the heat sealing can be easily performed, because the flange part 4 is excellent in heat resistance and the projecting portion 5 is excellent in heat sealability.

FIG. 3 shows a crystallization state of the flange part 4 and an amorphous state or a low crystallization state of the projecting portion 5. There are made, amorphous or lowly crystalline, the surface of the projecting portion 5 in FIG. 3(a), the surface of the projecting portion 5 and the inner peripheral side of the flange part 4 in FIG. 3(b), the whole projecting portion 5 in FIG. 3(c), the whole projecting portion 5 and an outer peripheral side of the flange part 4 in FIG. 3(d), the whole projecting portion 5 and the upper surface of the flange part 4 in FIG. 3(e), and the whole projecting portion 5 and an undersurface of the flange part 4 in FIG. 3(f), respectively.

Moreover, among them, it is preferable to dispose an amorphous portion or a lowly crystallized portion in the flange part 4 in that shock resistance is imparted to the flange part 4, and the crystallinity of the amorphous portion or the lowly crystallized portion is preferably less than 20%.

As to the number, shapes, and the like of the projecting portions 5 of the flange part 4, various modes can be adopted, and the projecting portions 5 are disposed on one periphery or a plurality of peripheries in consideration of balance between mechanical strength and heat sealability. The projecting portions 5 may be disposed continuously and/or intermittently on a circumference, or on a flange part face in a spiral or another form.

Figure 24A:
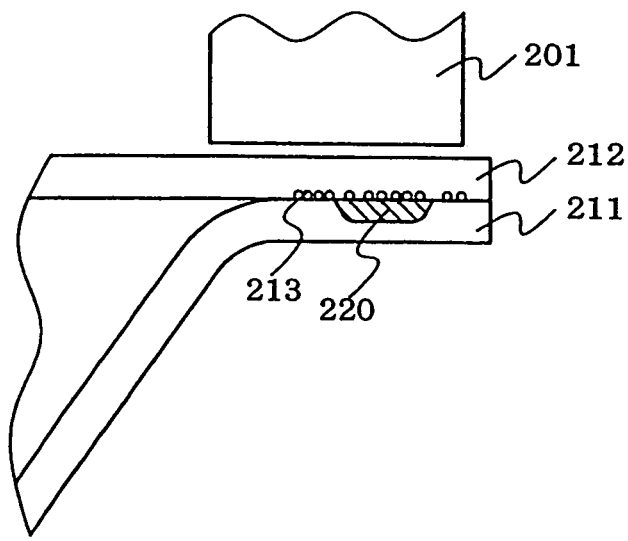
FIG. 24 is an explanatory view of a sealing head for use in heat sealing.
Figure 24B:
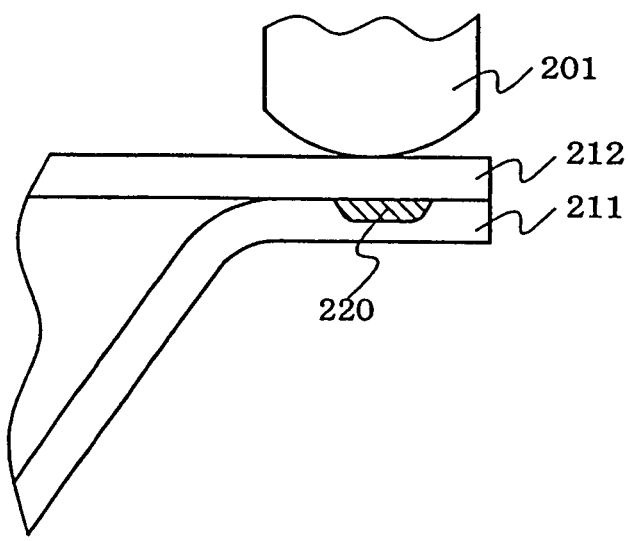

Moreover, examples of a sectional shape of the projecting portion 5 include a square shape, a semicircular shape, and a triangular shape, an appropriate shape is selected in accordance with conditions such as characteristics of a resin for use, a temperature during molding, and a clamp closing force, and the square shape is preferable in consideration of a sealing area or the like. The thickness of the projecting portion 5 is preferably 0.1 to 2.0 mm. When this thickness is less than 0.1 mm, the resin of the projecting portion 5 flows and easily, disappears owing to heat and pressure during heat sealing depending on the conditions of the heat sealing. Further, during bite sealing of liquid contents having a state similar to that shown in FIG. 24(a), bubbles due to vapor are generated between the flange part and the cover member, and a sealing defect is easily generated. On the other hand, in a case where the thickness exceeds 2.0 mm, when a sealing material is peeled and opened, appearance degrades after the material is opened, and palatability is not satisfactory.

Moreover, a width of the projecting portion 5 in a container diametric direction is preferably 0.5 mm to 3.0 mm. When this width is less than 0.5 mm, the amorphous portion or the lowly crystallized portion is so small that the sealing strength cannot be maintained in some case. In a case where a fibrous substance included in the contents is bitten and sealed, even when the substance is a short fiber, a sealing defect is easily generated. On the other hand, when the width exceeds 3.0 mm, bubbles are bitten during sealing, thereby lowering the sealing strength in some case.

It is to be noted that in the polyester container of the present invention, the thickness differs with a size, a portion to be measured, and the like. In general, the trunk portion 2 and the bottom portion 3 have a thickness of 0.1 to 5 mm, especially 0.2 to 3 mm, and this range is preferable in view of strength or moldability of the container.

Figure 4A:
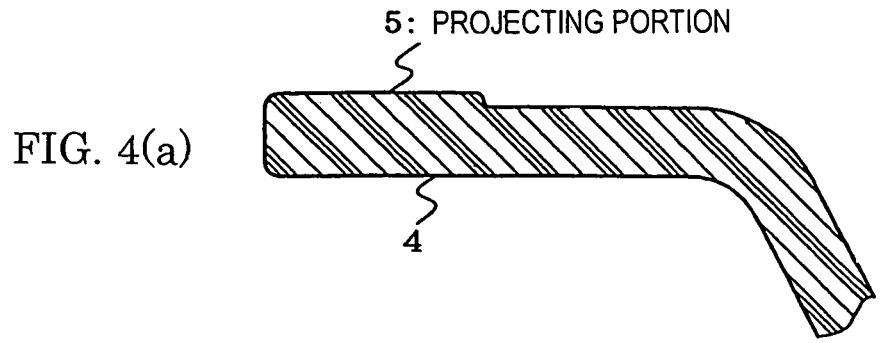
FIG. 4 is a reference diagram of a position where the projecting portion is formed on the upper surface of the flange part.
Figure 4B:
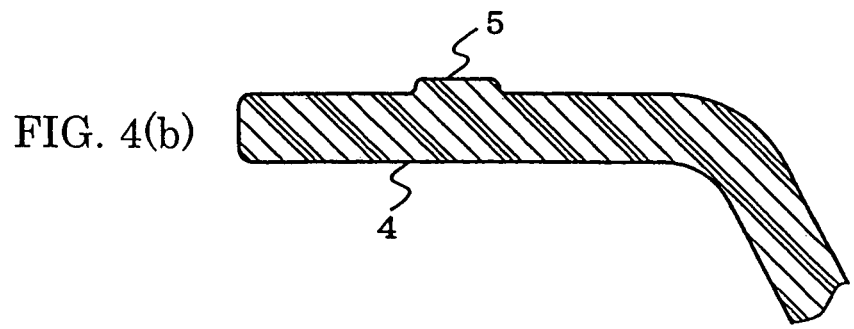
Figure 4C:
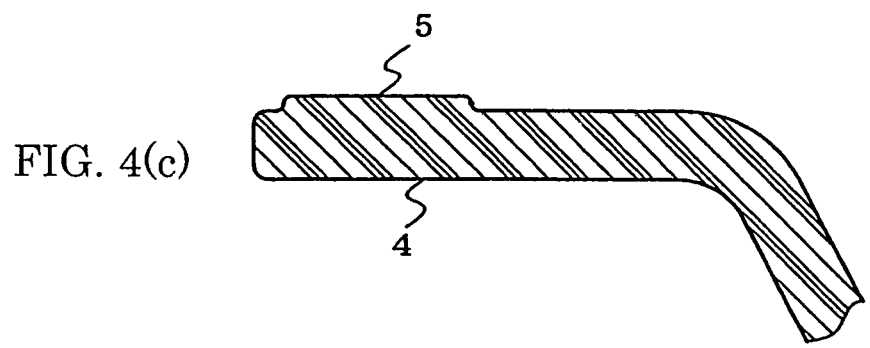

The projecting portion 5 having a non-orientation or low-orientation state can be formed on the outer peripheral side of the flange part shown in FIG. 4(a), the center of the flange part shown in FIG. 4(b), the outer peripheral side of the flange part shown in FIG. 4(c), the center and the outer peripheral side of the flange part (not shown) or the like.

Figure 4D:
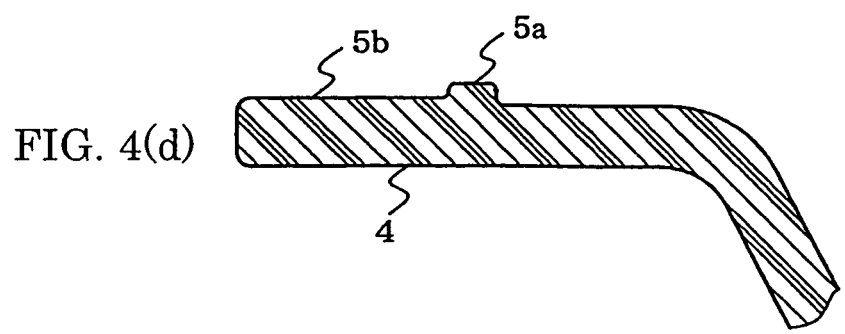

Moreover, as shown in FIG. 4(d), a high projecting portion 5a is formed on the center, and a low projecting portion 5b is formed on the outer peripheral side. The projecting portions may be disposed in a stepwise manner.

In a case where the projecting portion 5 for heat sealing is disposed on the upper surface of the flange part 4, even when a usual sealing head having a flat abutment portion is used during the heat sealing, it is possible to effectively release the vapor generated by air between the flange part 4 and a sheet, sandwiched substances such as liquid contents, and the vapor generated from liquid contents by heat of the heat sealing. Since the sealing head having the flat abutment portion can be used in this manner, it becomes easy to position of the sealing head.

In the polyester container of the present invention, various resin materials may be appropriately selected in the sealant layer of the cover member by controlling the shape or the size of the projecting portion 5. For example, it is preferable to use the cover member having the sealant layer made of a polyester resin having a melting point of 110 to 225° C. in that the heat sealing is possible at comparatively low-temperature, for example, 250° C. or less, and the flange part is prevented from being deformed or the bubbles are prevented from being bitten during the heat sealing of the cover member to the flange part, and in view of the heat sealability.

As this sealant layer, among polyester resins, a polybutylene-terephthalate (PBT)-based resin is preferable in that its crystallization speed and its solidification speed after the heat sealing are high, both the appropriate heat resistance and low-temperature heat sealability can be established, and bite sealability or the like is excellent.

Moreover, as the sealant layer, a polyethylene terephthalate (PET)-based resin having an amorphous state or a low crystallization state is preferable in that the resin exhibits the sufficient heat resistance against a hot warmer and the appropriate low-temperature heat sealability, and the resin exhibits the excellent bite sealability and high sealing strength owing to an effect of removing the contents by the projecting portion 5 and an effect of a resin lump of the projecting portion 5 formed during the heat sealing.

Figure 5A:
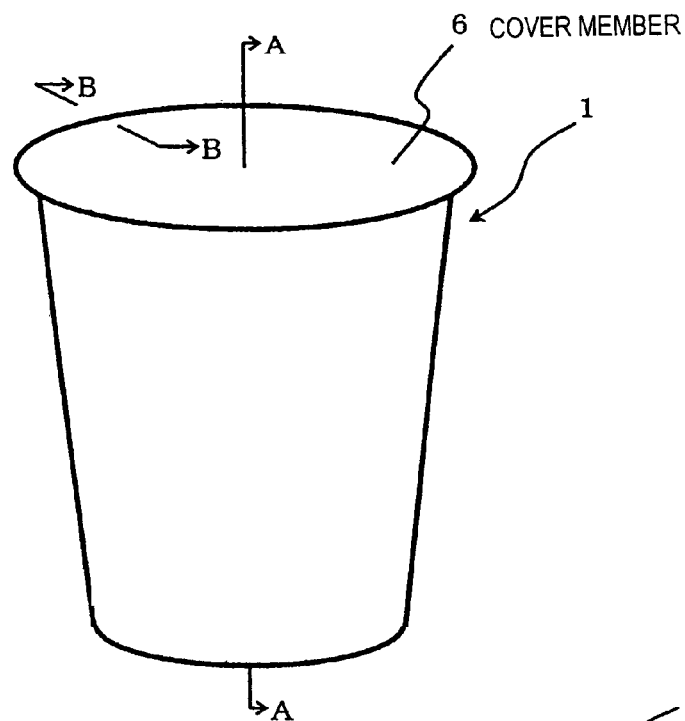
FIG. 5 is a diagram showing a state where the polyester container is heat-sealed with a cover member.
Figure 5B:
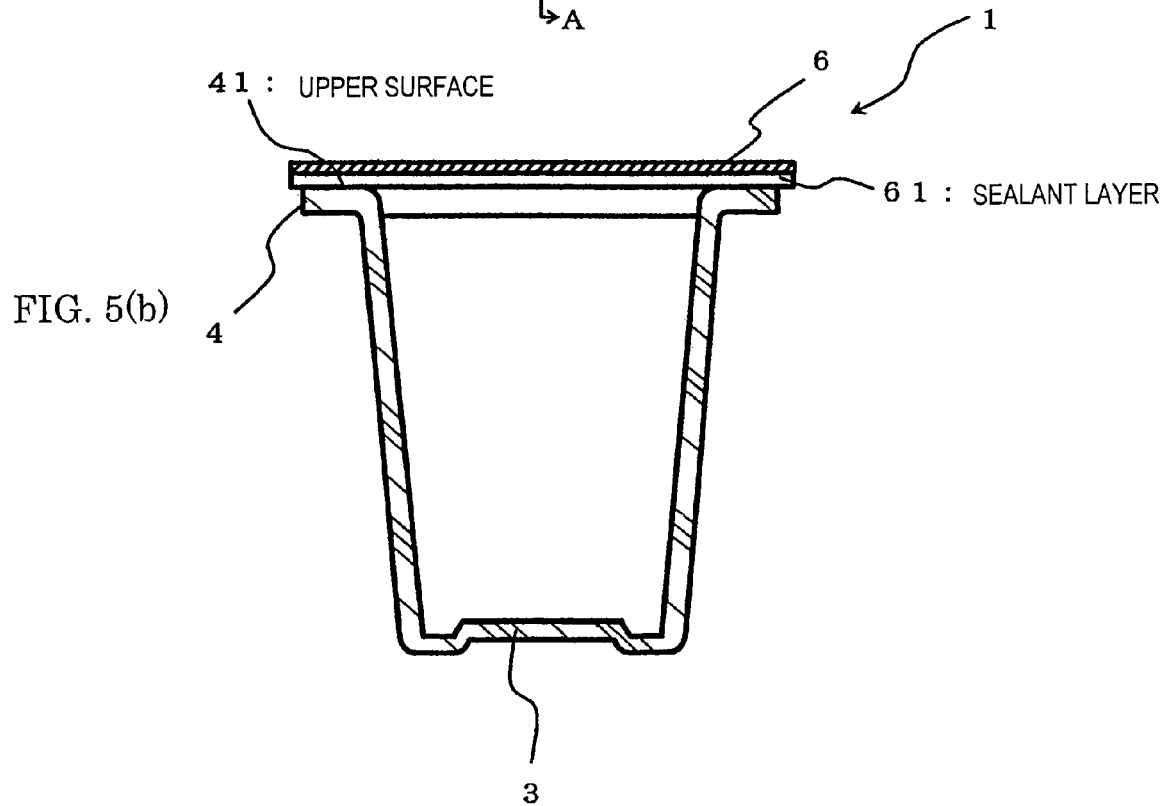

As shown in FIG. 5, after the contents are contained in the polyester container 1, the opening rim part is heat-sealed with a cover member 6, and the polyester container 1 is used as a sealed container which is packed with the contents in a sealing manner. In the shown example, an upper surface 41 of the flange part 4 disposed on the opening rim part is heat-sealed with the cover member 6 having a sealant layer 61 on an inner face thereof. Therefore, an opening of the polyester container 1 is sealed.

It is to be noted that FIG. 5(a) is a perspective view schematically showing the polyester container 1 constituted by heat-sealing with the cover member 6, and FIG. 5(*b*) is a sectional view cut along the A-A line of FIG. 5(*a*).

Figure 6A:
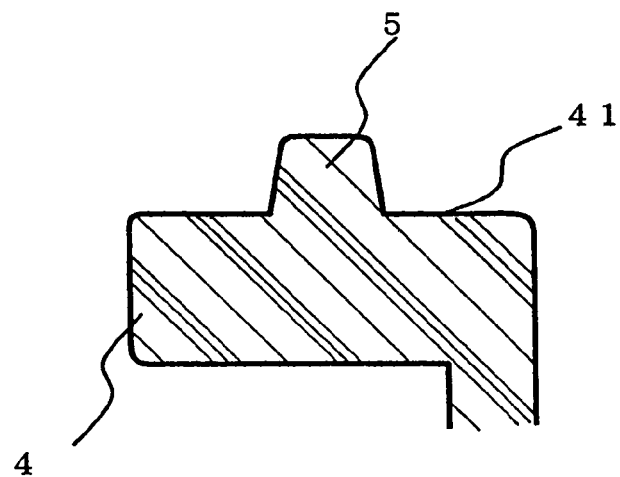
FIG. 6 is a sectional view showing an example of a sectional shape of the flange part.
Figure 6B:
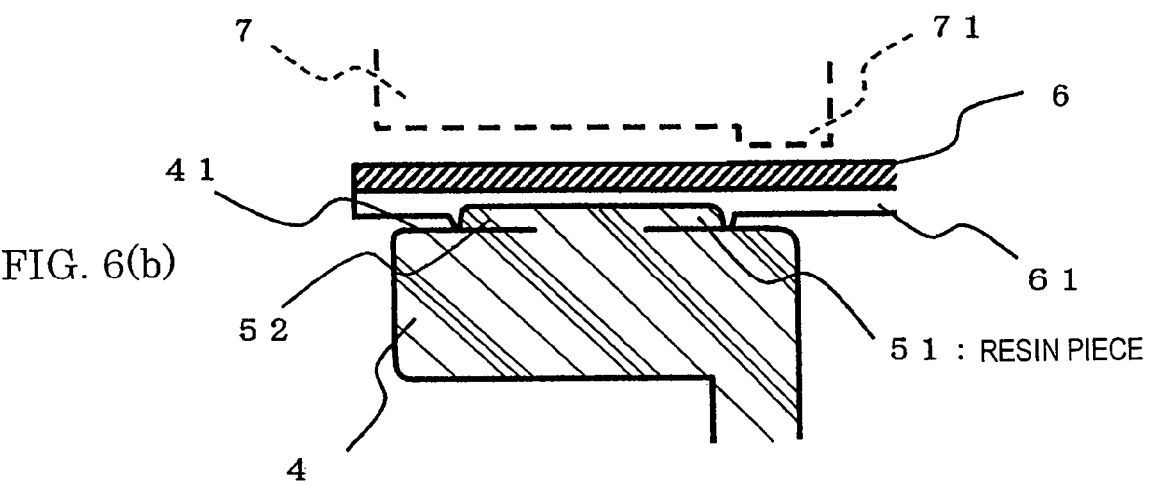

FIG. 6(*a*) shows a sectional shape of the flange part 4 before the heat-sealing with the cover member 6. The projecting portion 5 whose section is trapezoidal is formed on the upper surface 41 of the flange part 4. In the projecting portion 5, as described above, at least a portion constituting a heat-sealing-face is an amorphous portion or a lowly crystallized portion.

To perform the heat sealing, the flange part 4 is laid on a receiving base in a state where the sealant layer 61 of the cover member 6 is allowed to abut on the upper surface 41 of the flange part 4, and a heat seal portion is heated and pressurized with a heat sealing bar, a high-frequency inductive heating seal head, an inductive heat sealing head, an ultrasonic heat sealing head or the like.

At this time, the projecting portion 5 formed on the upper surface 41 of the flange part 4 is molten by the heat from the sealing head, and the projecting portion 5 is pressed by the sealing head, and deformed so as to preferably form resin pieces 51, 52 appressed against the upper surface 41 of the flange part 4 shown in FIG. 6(*b*).

It is to be noted that FIGS. 6(*a*) and (*b*) are sectional views showing a portion corresponding to the B-B section of FIG. 5(*a*) in the polyester container 1 before the heat-sealing of the cover member 6, and the polyester container 1 constituted by heat-sealing with the cover member 6, respectively.

When the heat-sealing with the cover member 6 is carried out, the heat sealing conditions are appropriately selected so that the projecting portion 5 is deformed so as to form the resin pieces 51, 52 in a state where they are appressed against the upper surface 41 of the flange part 4, and the cover member 6 is securely sealed. However, the conditions depend on a material constitution of the cover member 6, a sealant resin constituting the sealant layer 61, a resin constituting the heat seal portion of the container main body 2, and further a heat sealing method or a sealing speed in a filler sealing machine. Usually the heat sealing is performed at a heat sealing temperature of 180 to 250° C., but the present invention is not limited to this condition. A pressing force of the sealing head differs with a size of the container 1, a shape or a size of the projecting portion 5 or the like, but the force is usually about 50 to 300 kgf per container, and a heat sealing time is usually about 0.5 to 3 seconds.

In a case where the upper surface 41 of the flange part 4 is heat-sealed with the cover member 6, the molten projecting portion 5 is pressed with the sealing head, and the resin pieces 51, 52 are formed in a state where they are appressed against the upper surface 41 of the flange part 4. Accordingly, it is possible to regulate shapes or sizes of the resin pieces 51, 52.

That is, when there is a gap between the upper surface 41 of the flange part 4 and the formed resin pieces 51, 52, the projecting portion 5 is naturally deformed, it becomes difficult to control the shapes or the sizes of the resin pieces 51, 52, and unevenness is generated in the shapes or the sizes of the resin pieces 51, 52 depending on the heat sealing conditions, environmental temperature and the like. However, in a case where the resin pieces 51, 52 are formed in a state where they are appressed against the upper surface 41 of the flange part 4, the projecting portion 5 in the course of its deformation is sandwiched between the cover member 6 pressed with the sealing head from above and the upper surface 41 of the flange part 4 from below to regulate the deformation of the projecting portion 5 in a vertical direction. Moreover, the projecting portion 5 is deformed so as to protrude toward the interior or the exterior of the container, so that the resin pieces 51, 52 are formed. Therefore, it is easy to control the shapes or the sizes of the resin pieces 51, 52.

It is to be noted that as to a vertical position relation, an opening side of the polyester container 1 is disposed above, and a bottom portion 3 side is disposed below.

Therefore, there is the less unevenness in the shapes or the sizes of the resin pieces 51, 52 protruded in a state where they are appressed against the upper surface 41 of the flange part 4, and the pieces are formed with a satisfactory shape reproducibility.

At this time, as shown by a broken line in FIG. 6(*b*), a stepped portion 71 is disposed on a portion corresponding to a pointed end of the resin piece 51 of a sealing head 7. Alternatively, although not shown, a stepped portion is formed on a portion corresponding to the pointed end of one of the resin pieces 51, 52. In this case, it is possible to regulate thicknesses and protruding lengths of the resin pieces 51, 52. To regulate the thicknesses or the protruding lengths of the resin pieces 51, 52, it is effective to dispose on the sealing head such stepped portion made of a material having a low thermal conductivity in that an influence of heat of the heat sealing on the stepped portion is reduced.

In the present embodiment, these means may be combined for use. In consequence, appropriate regions of the heat sealing conditions expand, and the resin pieces 51, 52 can be formed with more satisfactory shape reproducibility.

Figure 7:
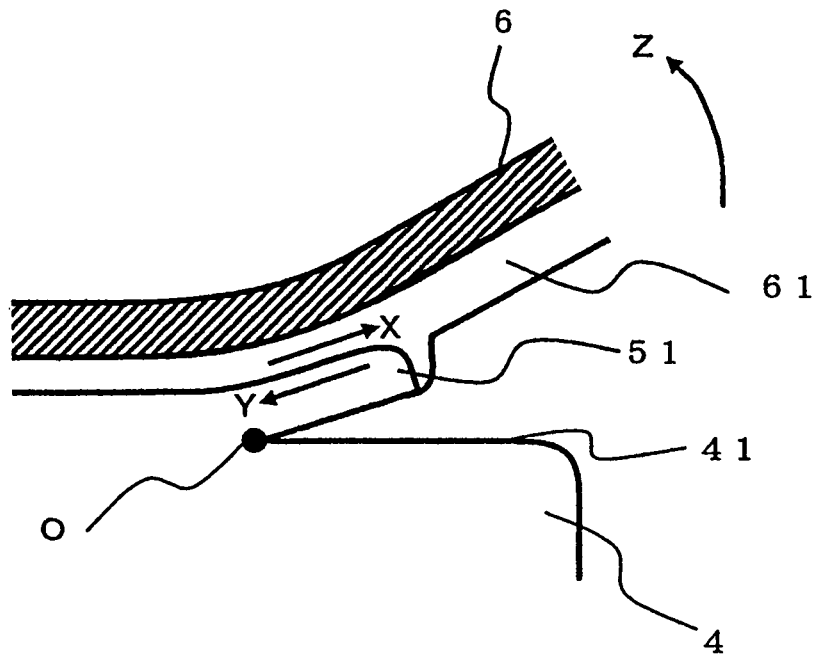
FIG. 7 is an explanatory view schematically showing a state where a force to peel the cover member is exerted from the interior of the container.

Moreover, when such resin pieces 51, 52 are bonded to the sealant layer 61 of the cover member 6, for example, a pressure in the container becomes high, so that a force to peel the cover member 6 is exerted outwards from the interior of the container (in a direction shown by an arrow Z in the drawing) as shown in FIG. 7, and the resin piece 51 formed so as to protrude toward the interior of the container rises together with the cover member 6.

At this time, a shear peeling force is generated in an interface between the sealant layer 61 of the cover member 6 and the resin piece 51 in directions shown by arrows X, Y in the drawing, and a detaching force exerted on the cover member 6 is converted into the shear peeling force by the rising of the resin piece 51. Since shear peeling strength is sufficiently strong, the cover member 6 does not peel from the resin piece 51. Furthermore, in this case, a stress acting on a heat seal edge of the cover member 6 acts on a point O of a root of the resin piece 51. Therefore, an effect of reinforcing the resin piece 51 effectively prevents the heat seal edge of the cover member 6 from being broken.

Figure 8:
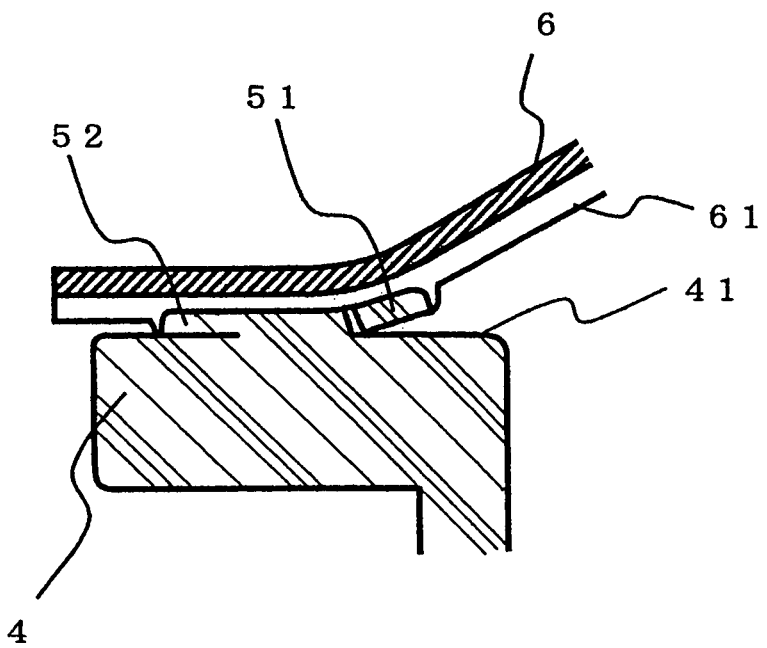
FIG. 8 is an explanatory view schematically showing a state where a resin piece is broken.

Therefore, as shown in FIG. 8, the cover member 6 is peeled by tearing the resin piece 51 from the flange part 4 to break the material, and the sealing strength in the heat seal portion can be improved.

The resin piece 51 and the sealant layer 61 may be bonded to at least such an extent that the resin piece 51 can rise together with the cover member 6. However, when the projecting portion 5 is molten and pressed with the sealing head, and deformed into the resin piece 51, the resin piece 51 is bonded to the sealant layer 61 so that the resin of the sealant layer 61 melts, flows, and permeates between the resin piece 51 and the upper surface 41 of the flange part 4 to cover the resin piece 51 with the resin. This is preferable for improving bonding strength.

In this case, strictly to say, the resin piece 51 is not directly appressed against the upper surface 41 of the flange part 4, but the resin piece 51 is substantially appressed against the upper surface, and this does not depart from the scope of the present invention.

Moreover, in this regard, in a case where the projecting portion 5 is deformed to form the resin piece 51, a void is sometimes formed between a root portion of the resin piece 51 and the upper surface 41 of the flange part 4. Even in such case, another portion of the resin piece 51 may be appressed against the upper surface 41 of the flange part 4.

Additionally, in a case where the resin piece 51 is formed as described above to improve the sealing strength of the heat seal portion, if the thickness of the root portion of the resin piece 51 is not sufficient, the resin piece 51 is easily stripped from the flange part 4, and the sealing strength drops.

Therefore, if the resin piece 51 is not formed with the satisfactory shape reproducibility, the unevenness is generated in the shape or the size of the resin piece 51, and the root portion of the resin piece 51 is not formed into a certain thickness, the unevenness is generated in the sealing strength in a case where the root portion of the resin piece 51 is formed to be thin and thick.

That is, a force required for stripping the resin piece 51 from the flange part 4 differs with the thickness of the root portion of the resin piece 51. Therefore, since there is the unevenness in the thickness of the root portion of the resin piece 51, the sealing strength also varies.

Moreover, even in a case where the root portion of the resin piece 51 is formed in a certain thickness, unless the shape or the size of another portion is formed to be constant, the unevenness is also generated in the rising of the resin piece 51. For example, if the resin piece 51 is formed into a shape incapable of easily rising, the above-described effect cannot be obtained, and this also generates the unevenness in the sealing strength.

It is to be noted that an example has been described above in which the force to peel the cover member 6 is exerted from the interior to the exterior of the container, but this also applies to a case where the cover member 6 is peeled and opened from the exterior to the interior of the container as described later. The unevenness is also generated in openability unless the resin piece 52 is formed with the satisfactory shape reproducibility.

When the resin pieces 51, 52 are formed in a state where they are appressed against the upper surface 41 of the flange part 4 as described above, the unevenness of the shapes or the sizes of the resin pieces 51, 52 can be suppressed, and the resin pieces 51, 52 can be formed with the satisfactory shape reproducibility.

Therefore, since the polyester container 1 includes the protruded resin pieces 51, 52 formed in the state where they are appressed against the upper surface 41 of the flange part 4, the container has stable product characteristics such as high sealing strength and the less unevenness of sealing strength (sealability).

Especially, if the sealing strength varies in a weakening direction, a seal leakage is generated, and reliability of a product is remarkably impaired. However, when the above constitution is adopted, the unevenness of the sealing strength in the weakening direction is remarkably reduced. Therefore, the sealing strength does not have to be set to be excessively higher in consideration of the unevenness of the sealing strength in the weakening direction so as to prevent the seal leakage from being generated, whereby easy peel opening properties from the exterior of the container are not impaired.

In the example shown in FIG. 6(a), the similarly high sealing strength is obtained also from the exterior of the container, and the container cannot be easily peeled and opened. Therefore, when the cover member 6 is opened with an over cap having an opening function, a straw or the like, a mischief preventing function is effectively improved.

However, in a case where a polyethylene terephthalate-based thermoplastic resin is used in a material of the container main body 2. The formed resin pieces 51, 52 are brittle in an environment at a temperature lower than a glass transition point (Tg). When an inner pressure, dropping impact, and the peeling force from the exterior of the container function, a stress is concentrated on the roots of the resin pieces 51, 52, and the resin pieces 51, 52 are sometimes destroyed.

Therefore, to obtain the sufficient sealability, the root portions of the resin pieces 51, 52 need to be formed to be thick, but it is also easy to control the thicknesses of the root portions of the resin pieces 51, 52. Accordingly, breaking strength of the root portions of the resin pieces 51, 52 can be controlled to obtain the high sealability stably.

The thicknesses depend on the shapes or the sizes of the resin pieces 51, 52, but in general, the thick and short resin pieces 51, 52 do not easily rise, and accordingly the sealant layer 61 of the cover member 6 needs to be strongly bonded to the resin pieces 51, 52 in order to obtain the sufficient sealing strength. Conversely, the thinner and the longer the resin pieces 51, 52 are, the more easily they rise, and the bonding between the sealant layer 61 of the cover member 6 and the resin pieces 51, 52 can be weakened.

In the present invention, the shapes or sizes of the resin pieces 51, 52 are approximately adjusted in consideration of the demanded sealing strength (sealability) from the interior of the container and peeling sealability from the exterior of the container. It is to be noted that in general, when easy peeling properties and high openability are demanded, bonding strength between the cover member 6 and the polyester container 1, measured from the exterior of the container, is preferably 5 to 20 N/width of 15 mm.

Here, in the present embodiment, a length L of the resin piece 51 formed so as to protrude toward the interior of the container is preferably 0.5 to 5 mm, more preferably 1 to 3 mm.

When the above-described region is not satisfied, the length of the resin piece 51 becomes insufficient, the resin piece 51 does not rise together with the cover member 6, the interface between the sealant layer 61 of the cover member 6 and the resin piece 51 peels, or cohesion peeling of the sealant layer 61 is caused, and the sufficient sealing strength cannot be obtained. Furthermore, the unevenness of the sealing strength (sealability) increases every container or in one container. To prevent the seal leakage, the heat sealing conditions have to be set assuming a case where the sealing strength becomes weakest. There is generated a disadvantage that the sealing strength becomes excessively higher, and the sealability has to be sacrificed.

Conversely, when the resin piece 51 lengthens exceeding the above-described region, a disadvantage occurs that the resin piece 51 becomes thin, and the breaking strength weakens. When the resin piece 51 is formed to be thick, a disadvantage occurs that the projecting portion 5 is formed to be large, and the heat sealing conditions have to involve a high temperature, a long time, and a high pressure which depart from realistic condition regions.

Moreover, the thickness of the resin piece 51 depends on a material to be used or demanded heat sealing strength, but a thickness t of at least the root portion of the resin piece 51 is preferably 0.01 to 1 mm, more preferably 0.03 to 0.5 mm.

When the thickness of the resin piece 51 is under the above region, the strength of the resin piece 51 becomes insufficient, the resin piece 51 is easily stripped from the flange part 4, and the sufficient sealing strength cannot be obtained.

Conversely, when the thickness of the resin piece 51 is over the above region, the resin piece 51 is not easily deformed, and a trouble is caused in raising the resin piece 51. In principle, the resin piece 51 can be lengthened so as to prevent the trouble from being generated during the rising. However, disadvantages also occur that a protrusion has to be enlarged in order to obtain a sufficient resin amount for forming the resin piece 51, and the heat sealing has to be performed at a high temperature for a long time under a high pressure to such an extent that the heat sealing conditions depart from the realistic condition ranges.

On the other hand, the length or the thickness of the resin piece 52 formed so as to protrude toward the exterior of the container can be set in a range similar to that of the resin piece 51. However, in consideration of the easy opening properties, the resin piece 52 may be formed into a shape incapable of easily rising so that the peeling of the interface between the sealant layer 61 of the cover member 6 and the resin piece 52 or the cohesive peeling of the sealant layer 61 easily occur. Alternatively, the resin piece 52 may be formed to be thin or small so that the resin piece 52 is easily stripped from the flange part 4.

Moreover, FIG. 6(a) shows an example in which the projecting portion 5 formed on the polyester container 1 has a trapezoidal sectional shape, but the sectional shape of the projecting portion 5 is not limited to the shown example as long as the resin pieces 51, 52 can be formed into desired shapes and sizes with the satisfactory shape reproducibility. Various shapes can be adopted in the sectional shape of the projecting portion 5 as described above as long as the projecting portion includes an amount of a resin required for forming the resin pieces 51, 52 into the desired shapes and sizes.

Moreover, the shown projecting portion 5 has a sectional shape which is symmetric between an exterior side and an interior side of the container, but it may be asymmetric. For example, if the resin piece 51 protruding toward the interior of the container is preferentially obtained by forming the projecting portion 5 into a substantially triangular sectional shape having an inclined face which becomes thick inwards from the exterior of the container, the easy opening properties can be secured, and the high sealing strength can be exhibited against the force to peel the cover member 6 outwards from the interior of the container.

As described above, the shape or the size of the projecting portion 5 may be appropriately set so as to obtain the desired shapes and sizes of the resin pieces 51, 52, and is not limited. However, as to a protrusion shown in FIG. 6(a), in general, a thickness is preferably 0.1 to 2 mm, and a width in a container diametric direction is preferably 0.5 to 3 mm.

To secure the easy opening properties, it is also effective that the thickness of the flange part 4 is varied between an internal side and an external side of the container divided by the projecting portion 5 formed on the upper surface 41.

Figure 9A:
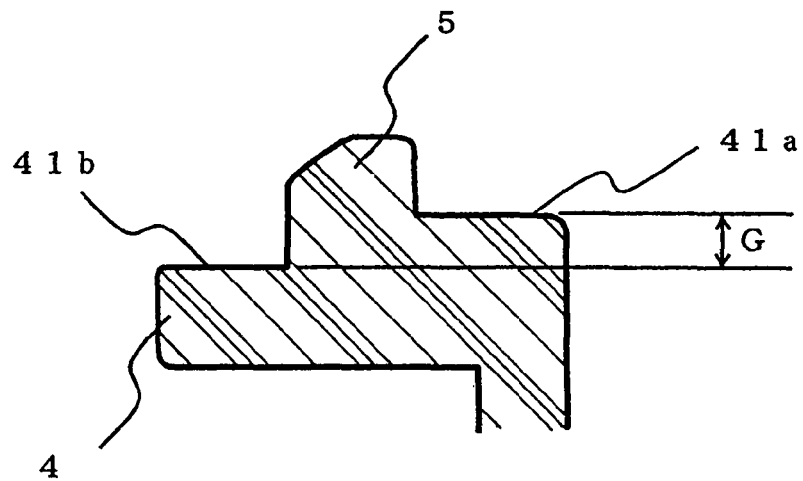
FIG. 9 is a sectional view showing another example of the sectional shape of the flange part.

That is, in the example shown in FIG. 6, the thickness of the flange part 4 of the container main body 2 is set to be constant, and the upper surface 41 of the flange part 4 on an internal side of the container from the projecting portion 5 is disposed on the same plane as the upper surface 41 of the flange part 4 on an external side of the container from the projecting portion 5. However, as shown in FIG. 9(a), the thickness of the flange part 4 on the external side of the container from the projecting portion 5 may be reduced, whereby an upper surface 41b of the flange part 4 on the external side of the container from the projecting portion 5 may be formed relatively below an upper surface 41a of the flange part 4 on the internal side of the container from the projecting portion 5.

Accordingly, in a case where the container main body 2 is heat-sealed with the cover member 6, from the projecting portion 5 molten, pressed and thus deformed with the sealing head, a resin piece 53 protruding toward the interior of the container is formed on the internal side of the container in a state where the resin piece 53 is appressed against the upper surface 41a of the flange part 4, as in the case of the resin piece 51 in the example shown in FIG. 6. On the external side of the container, a resin piece such as the resin piece 52 in the example shown in FIG. 6 is not formed, and a resin lump 54 is formed instead.

When the cover member 6 is peeled outwards from the interior of the container, the resin lump 54 formed in this manner does not rise like the resin piece 52 in the example shown in FIG. 6. Therefore, the cover member 6 is peeled by the peeling of the interface between the sealant layer 61 of the cover member 6 and the resin lump 54 or the cohesive peeling of the sealant layer 61. When the bonding between the sealant layer 61 of the cover member 6 and the resin lump 54 is appropriately adjusted to the heat sealing strength which enables easy opening, the easy opening properties can be secured.

Figure 9B:
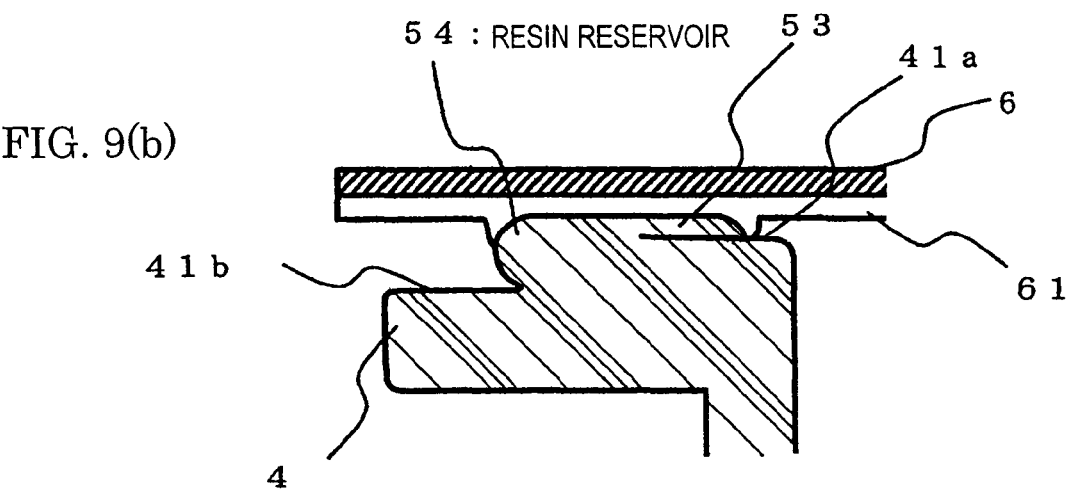

In the example shown in FIG. 9, it is possible to appropriately set how much the upper surface 41b of the flange part 4 on the external side of the container from the projecting portion 5 is disposed below the upper surface 41a of the flange part 4 on the internal side of the container from the projecting portion 5, that is, a degree of a gap G between the upper surface 41a and the upper surface 41b in consideration of a material to be used and the like so that rising of the formed resin lump 54 is difficult. Usually, the gap is preferably in a range of 0.05 to 3 mm, more preferably in a range of 0.1 to 2 mm.

When the gap G is under the above range, the rising of the formed resin lump 54 is not difficult, so that the easy opening properties cannot be secured.

Conversely, when the gap G is over the above range, the thickness of the flange part 4 cannot be secured, and the strength of the flange part 4 lowers. The flange can be formed to be thick so that the strength of the flange part 4 on the external side of the container from the projecting portion 5 becomes sufficient, but there occurs a disadvantage that a use amount of the resin increases or that a container molded from a sheet has to be thickened by, for example, an injection molding method or a compression molding method.

It is to be noted that the gap G between the upper surfaces 41a and 41b refers to a height difference between an uppermost portion of the upper surface 41a and a portion of the upper surface 41b on the side of the base portion of the projecting portion 5. Any flange may not be disposed on the external side of the container from the projecting portion 5.

Moreover, as shown in FIG. 9(a), an upper edge portion of the projecting portion 5 on the external side of the container may be cut into a tapered shape to control a size of the formed resin lump 54.

It is to be noted that in the example shown in FIG. 9(a), the upper edge portion of the projecting portion 5 on the external side of the container is cut into the tapered shape, but there is not any special restriction on a cutting mode as long as the projecting portion 5 on the external side of the container can be cut to control the size of the resin lump 54.

As described above, in the example shown in FIG. 9(b), the resin piece 53 formed so as to protrude toward the interior of the container is disposed in a state where they are appressed against the upper surface 41a of the flange part 4. Accordingly, the high sealing strength having the less unevenness can be stably obtained against the force to peel the cover member 6 outwards from the interior of the container. Moreover, when the cover member 6 is peeled from the exterior to the interior of the container, the cover member 6 can be easily peeled. The high sealing strength and the easy opening properties are simultaneously provided in this manner.

It is to be noted that the gap G may be disposed between the upper surfaces 41a and 41b over the whole periphery of the flange part 4, or an upper edge portion on a container external side of the projecting portion 5 may be cut into the tapered shape, but such constitution may be partially adopted in, for example, an opening start portion of the cover member 6 only to obtain the easy opening properties or the like. The gap G between the upper surfaces 41a and 41b, an angle of the taper obtained by cutting the upper edge portion on the container external side of the projecting portion 5, and a cut size can be varied every place in a region which does not prevent the openability. Especially, such example is preferably applied to a case where a specific part only is peeled to open the container.

Figure 10A:
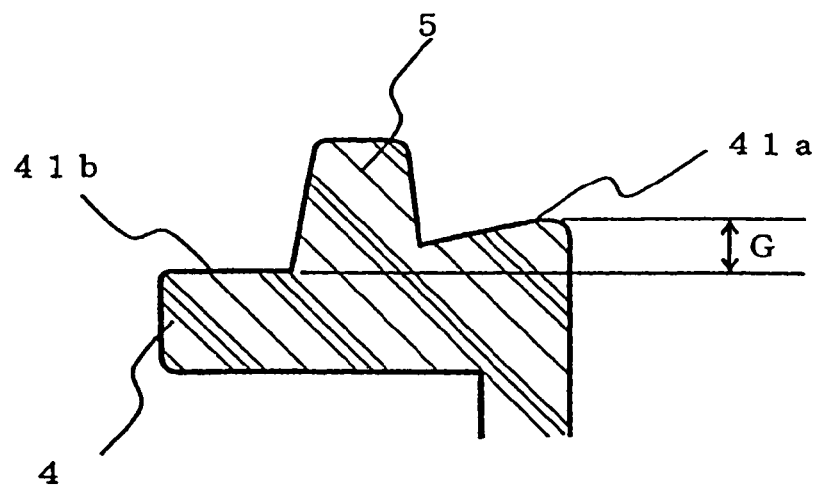
FIG. 10 is a sectional view showing still another example of the sectional shape of the flange part.
Figure 10B:
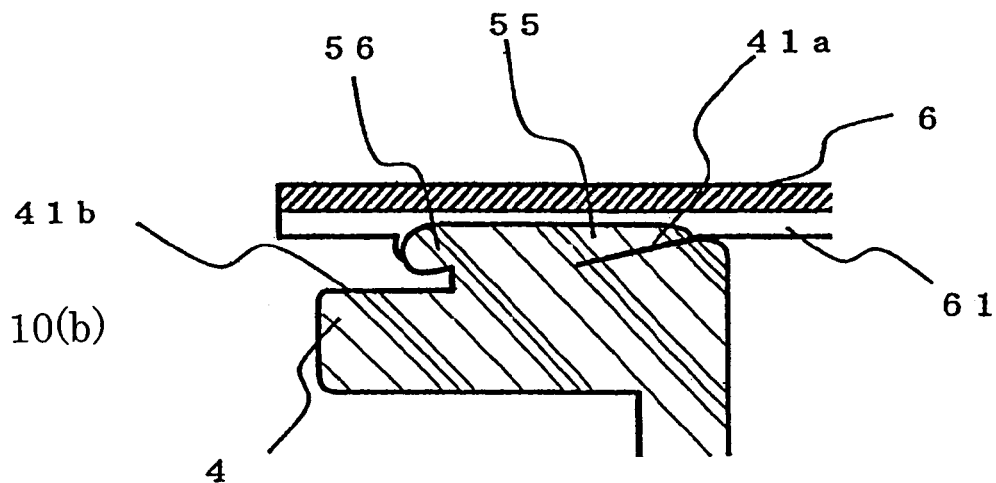

Furthermore, on the flange part 4, as shown in FIG. 10(a), the upper surface 41a on an internal side of the container from the projecting portion 5 is provided with a tapered face inclined obliquely upwards from the base portion of the projecting portion 5 to the interior of the container. The projecting portion 5 molten and pressed during the heat sealing of the cover member 6 is deformed along this tapered face in a state where the projecting portion is appressed against the upper surface 41a of the flange part 4. Accordingly, as shown in FIG. 10(b), a formed resin piece 55 can be tapered.

In consequence, the resin piece 55 can be formed with good shape reproducibility so that any unevenness is not generated in the shape or the size of the resin piece 55 while regulating the protruding length of the resin piece 55. Moreover, the root of the resin piece 55 is formed to be thick and solid, and tapered in a limited range of the resin amount. Accordingly, the resin piece 55 can securely be raised together with the cover member 6 from the interior of the container, and an effect of improving the sealing strength and an effect of suppressing the unevenness of the sealing strength are further improved. In addition, since the resin piece 55 easily rises, the bonding between the sealant layer 61 of the cover member 6 and the resin piece 55 may be weak, and it is possible to improve easy peel opening properties from the exterior of the container while maintaining the high sealability.

Figure 11A:
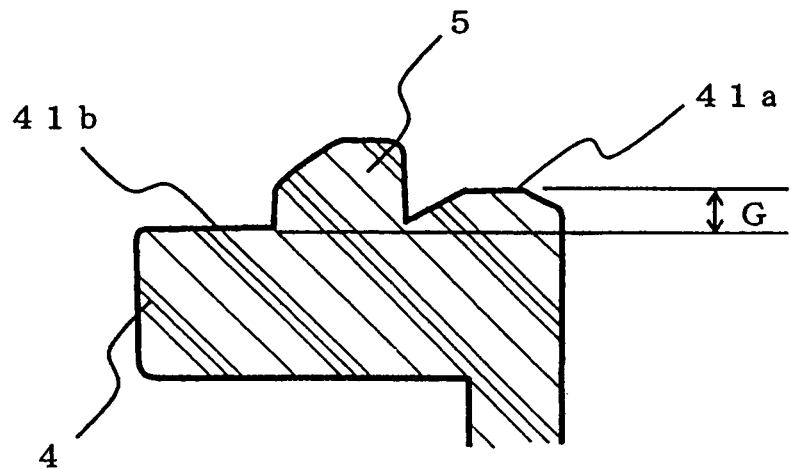
FIG. 11 is a sectional view showing a further example of the sectional shape of the flange part.

Moreover, in the example shown in FIG. 10, the whole upper surface 41a is formed into the tapered face, but as shown in FIG. 11(a), a portion of the upper surface 41a along the base portion of the projecting portion 5 may be cut into a groove shape to form a tapered face inclined obliquely upwards from the base portion of the projecting portion 5 to the interior or the container.

Figure 11B:
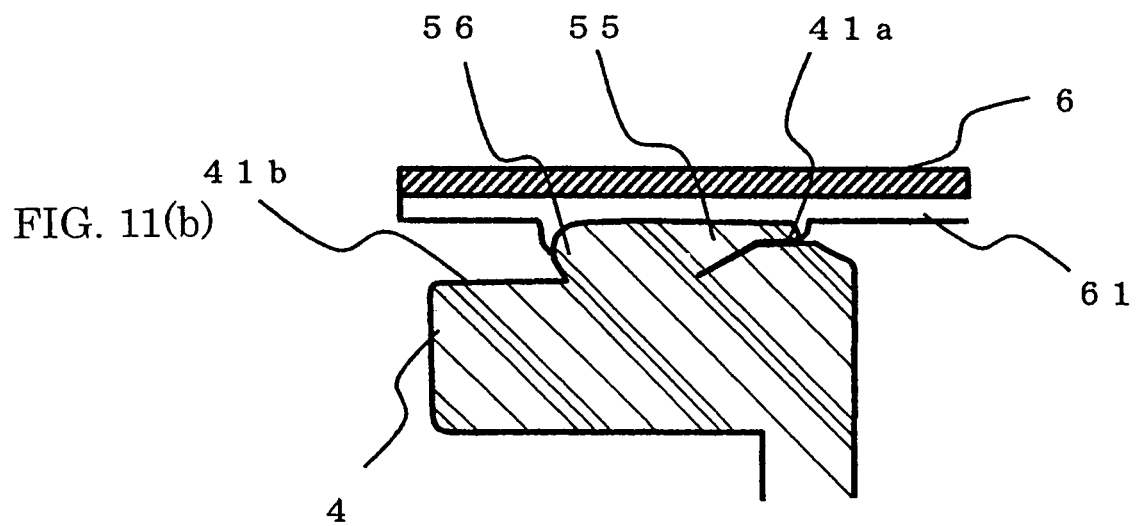

In this case, for example, as shown in FIG. 11(b), a pointed end portion of the formed resin piece 55 is sometimes formed so as to have a substantially constant thickness, but the thickness is not limited as long as the pointed end portion of the resin piece 55 is thinner than the root portion, and the resin piece 55 easily rises.

That is, the resin piece 55 does not have to become thin successively from the root portion toward the pointed end as long as the resin piece 55 is easily deformed following the cover member 6. That is, if there is a thin portion close to the pointed end, and the resin piece 55 is easily deformed following the cover member 6, there may be a thick portion close to the pointed end in the resin piece 55 in a range that does not cause any trouble.

Moreover, in the example shown in FIG. 10, a tapered resin piece 45 is formed using a space formed between the whole tapered upper surface 41a and a flat face (not shown) of a pointed end of the heat sealing head, but a tapered resin piece 55 may be formed by disposing the tapered face on the pointed end of the heat sealing head.

[Method for Manufacturing Polyester Container]

Next, there will be described a method for manufacturing the polyester container.

FIGS. 12 to 17 are diagrams showing a first embodiment of the method for manufacturing the polyester container.

[First Embodiment]

Figure 12:
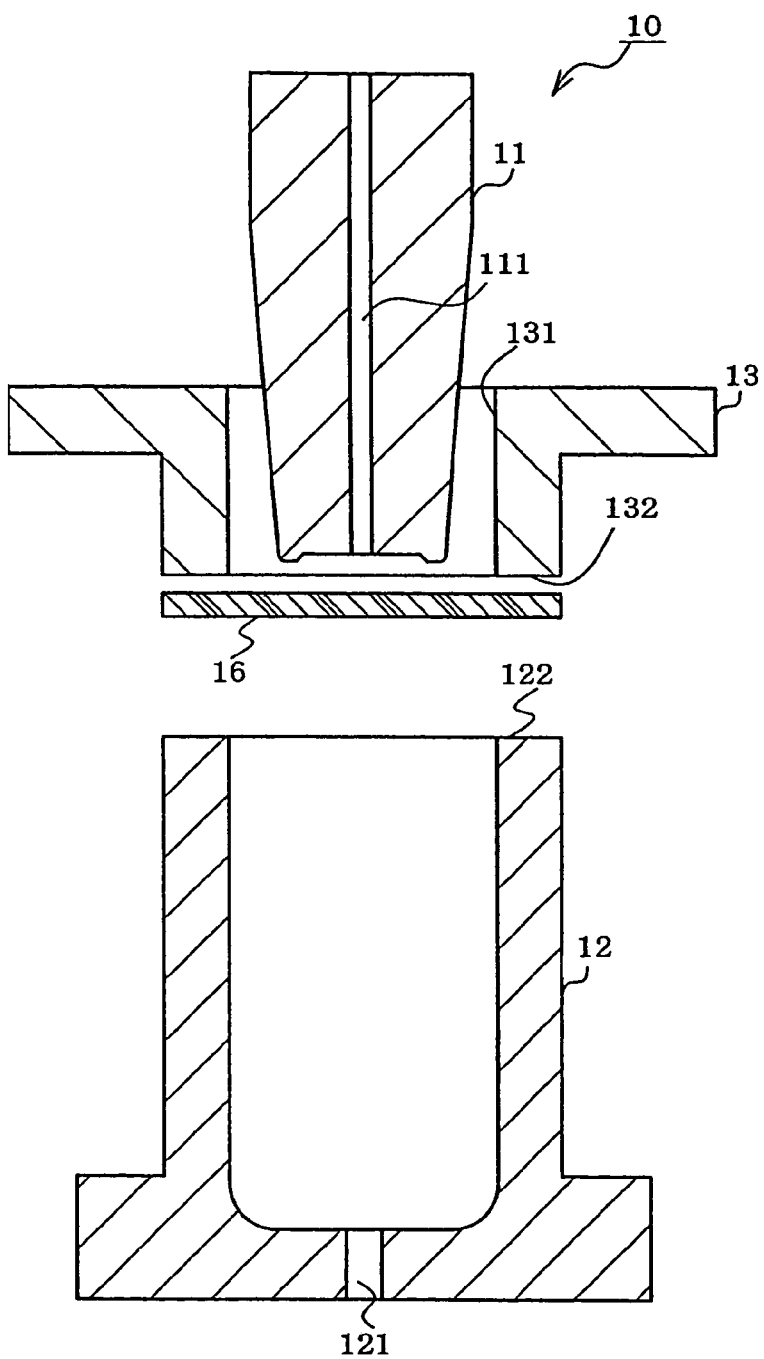
FIG. 12 is a diagram showing a state before draw molding in a first embodiment of the method for manufacturing the polyester container according to the present invention.
Figure 13:
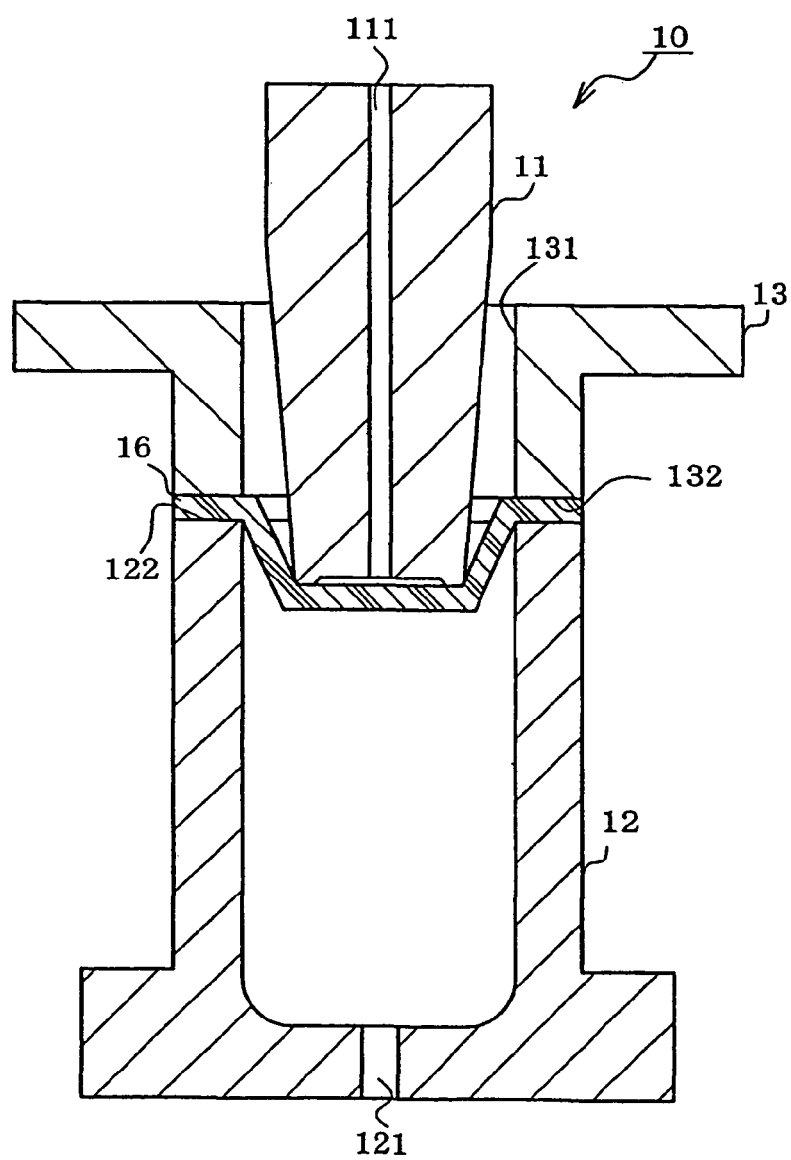
FIG. 13 is a diagram showing a start state of the draw molding in the first embodiment of the method for manufacturing the polyester container according to the present invention.
Figure 14:
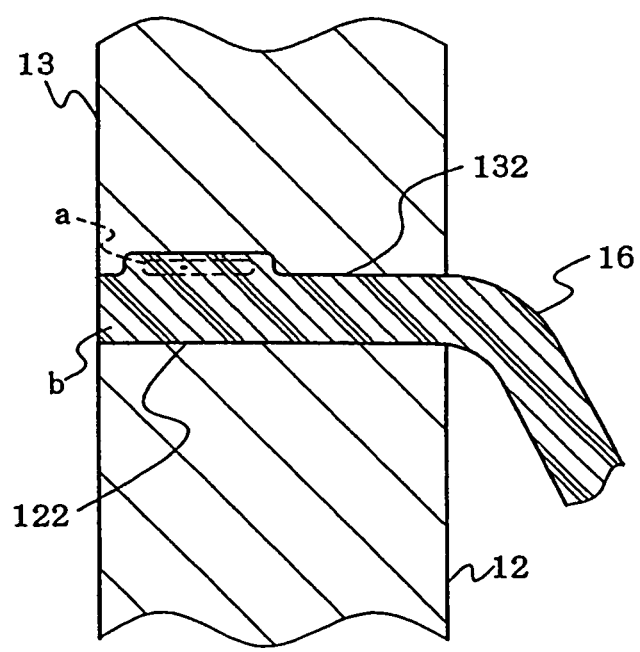
FIG. 14 is a diagram showing a step of molding a flange part and a projecting portion.
Figure 15A:
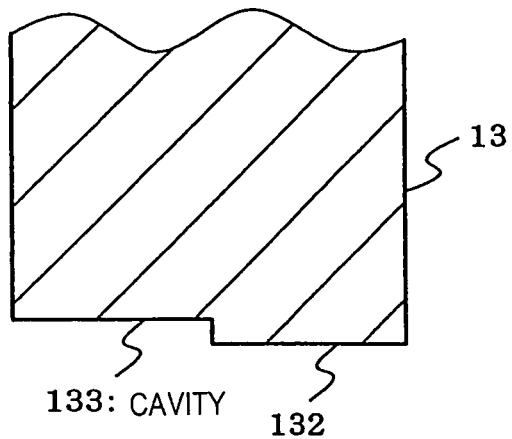
FIG. 15 is a sectional view showing an example of a clamp mold in the first embodiment of the method for manufacturing the polyester container according to the present invention.
Figure 15B:
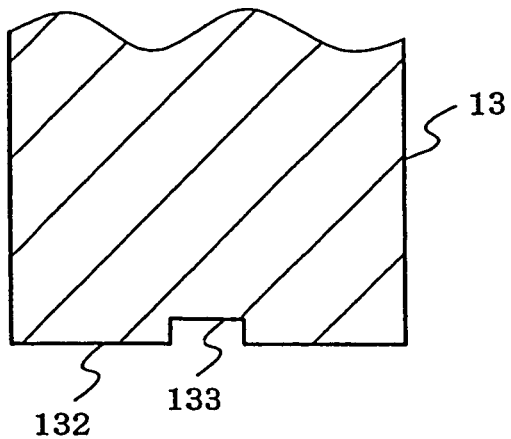
Figure 15C:
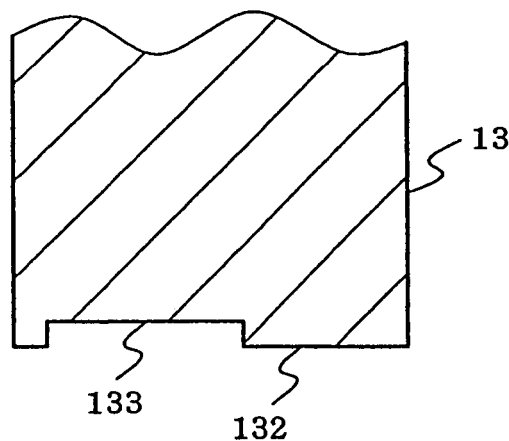
Figure 15D:
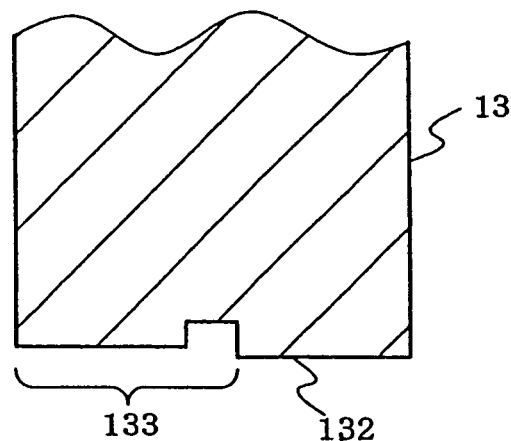

FIG. 12 is a schematic side sectional view of an example of a molding device for carrying out a manufacturing method of a first embodiment, FIG. 13 is a reference diagram in the beginning of draw molding, and FIG. 14 is an enlarged view showing molded states of a flange part and a projecting portion by a female mold and a clamp of a clamp mold.

As shown in FIG. 12, a molding device 10 is mainly constituted of a male mold plug 11, a female mold 12, and a clamp mold 13. As a molding material, there is appropriately supplied a polyester resin sheet 16 molten, pressed, and formed into a sheet, or an intermediate article (not shown) for molding a container by injection molding or compression molding, for example, a preform P or a flat sheet S. As shown in FIG. 13, the draw molding is started by the male mold plug 11 and the female mold 12, and a cup-like polyester container is manufactured.

It is to be noted that although not shown, in a case where the molding material is the preform P or the flat sheet S, in FIG. 12, the preform P or the flat sheet S is appropriately supplied instead of the sheet 16, and similarly oriented. Therefore, description of the drawing of the preform P or the flat sheet S is omitted here. There will be described hereinafter a case where the molding material is the molten and pressed sheet 16.

A temperature of the sheet 16 in the draw molding depends on a resin for use. In a case where the sheet substantially has an amorphous state or a low crystallization state, the temperature is a glass transition point (Tg)° C. to (Tg+60)° C., preferably (Tg+15)° C. to (Tg+30)° C. If the temperature of the sheet is higher than (Tg+60)° C., orientational crystallization does not sufficiently occur, a spherical crystal is generated by thermal crystallization in a subsequent heat setting step, and whitening phenomenon might occur. If the temperature is lower than Tg° C., a high force for molding is required. Additionally, molding becomes impossible, or the resin is excessively oriented during the molding, and the whitening phenomenon might occur.

The male mold plug 11 has an outer shape of a finally molded article, because the plug draws and molds the polyester resin sheet 16, and the plug contracts and shapes a cup-like container main body heat set by the female mold 12 after the draw molding. The male mold plug 11 is provided with a gas passage 111 for pressurizing in an axial direction by the female mold 12 during the heat sealing after the draw molding and for reducing a pressure during the contraction shaping by the male mold plug 11.

The female mold 12 draws and molds the cup-like container main body together with the male mold plug 11, and performs the heat set after the draw molding. An upper end face of the female mold 12 is provided with a flange part grasping face 122 which molds the flange part and a protrusion in cooperation with the clamp mold 13.

Moreover, the center of the female mold 12 is provided with a gas passage 121 for discharging a gas during the draw molding and for supplying a gas during the contraction shaping by the male mold plug 11.

The male mold plug 11 and the female mold 12 are coaxially arranged, and are relatively movable in the axial direction so that the male mold plug 11 is inserted into and detached from the female mold 12.

As shown in FIG. 14, the clamp mold 13 molds a flange part and a protrusion in cooperation with the female mold 12. The clamp mold 13 has an inner face 131 having a diameter which is substantially equal to that of a cylindrical inner face of the female mold 12. A lower end face of the clamp mold is provided with a grasping face 132 which faces the flange part grasping face 122 of the female mold 12.

Moreover, the female mold 12 cooperates with the clamp mold 13. The molds are clamped with the flat grasping face 122 of the female mold 12 and the grasping face 132 of the clamp mold 13 having a groove portion at least partially, and a flange part having a projecting portion is molded. At this time, a shape of the groove portion is not limited to that shown in FIG. 13, and various shapes can be used as shown in FIG. 15.

Examples of a shape of a groove portion 133 of the clamp mold 13 include shapes shown in FIGS. 15(a) to (d) for forming the flange part and the projecting portion shown in FIGS. 4(a) to (d).

During the molding of the flange part and the projecting portion, as the thickness of the resin of the flange part is reduced by clamp forces of the female mold 12 and the clamp mold 13, flow orientation occurs to perform the orientational crystallization. However, the thickness of the resin of a region a in the groove portion, that is, the resin corresponding to the projecting portion scarcely decreases by a mold closing force (clamp force) in contrast to the resin of a region b of the flange part, and therefore, a degree of the orientational crystallization by the flow orientation is low, and in consequence, the resin becomes a non-orientation or a low-orientation state.

It is to be noted that at this time, the temperature of the female mold 12 is preferably 130 to 200° C., especially preferably 150 to 180° C. in order to thermally crystallize the flange part in addition to the orientational crystallization, and impart rigidity and heat resistance to the flange part.

On the other hand, the temperature of the clamp mold 13 is preferably 70 to 130° C., especially preferably 80° C. to 100° C. in order to prevent the thermal crystallization of the projecting portion and impart the heat sealability.

Figure 16:
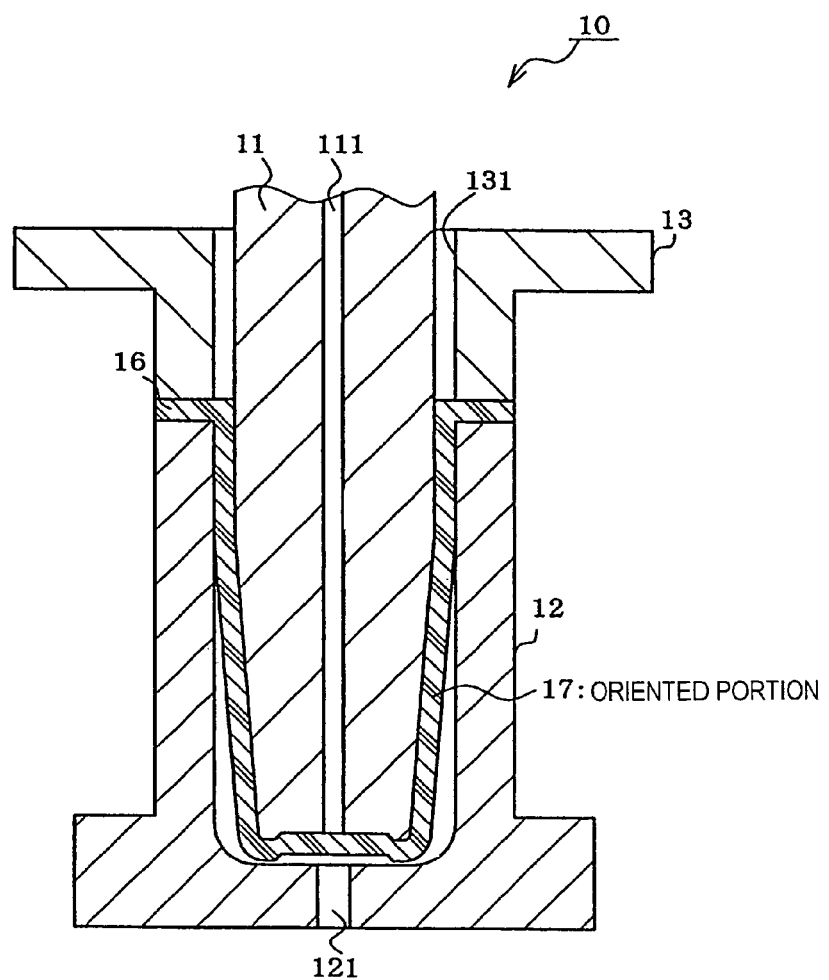
FIG. 16 is a diagram showing a draw molding step in the first embodiment of the method for manufacturing the polyester container according to the present invention.

Next, as shown in FIG. 16, the draw molding is further performed from the state of FIG. 13.

The male mold plug 11 is inserted up to a stroke end in the female mold 12 in a state where the flange part and the projecting portion are clamped by the female mold 12 and the clamp mold 13, and the sheet 16 is oriented to mold an orientationally crystallized oriented portion 17.

Thereafter, although not shown, compressed air is supplied (air is supplied) via the gas passage 111 of the male mold plug 11, the oriented portion 17 is appressed against the heated female mold 12, the oriented portion 17 is heat set, a remaining stress during the draw molding is removed, and the heat resistance is imparted.

Figure 17:
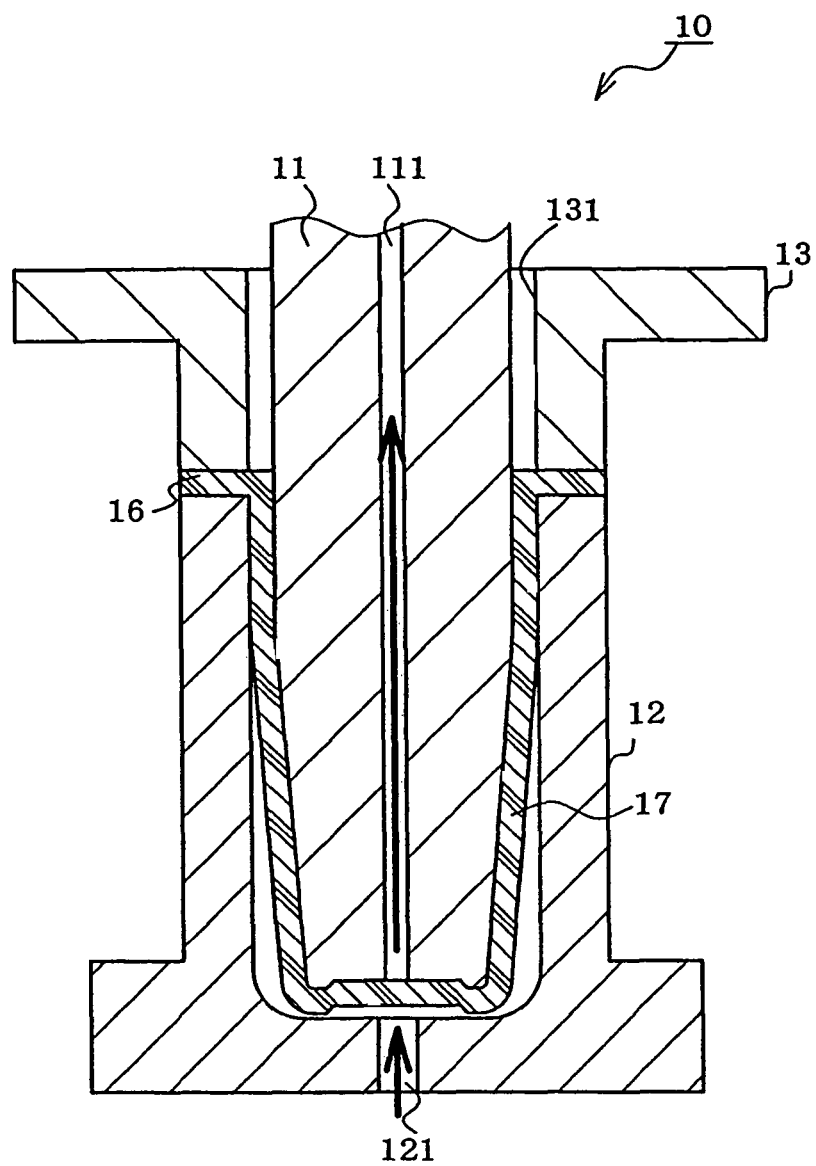
FIG. 17 is a diagram showing a cooling and shaping step in the first embodiment of the method for manufacturing the polyester container according to the present invention.

Finally, a cooling and shaping step is performed as shown in FIG. 17.

In this step, the compressed air supplied from the gas passage 111 of the male mold plug 11 is stopped, and self contraction is caused in the oriented portion 17. Moreover, when the oriented portion 17 is contracted to the outer surface of the male mold plug 11, air is sucked via the gas passage 111 to evacuate between the oriented portion 17 and the male mold plug 11, and the oriented portion 17 is shaped into a shape of the outer surface of the male mold plug 11, and then cooled.

At this time, the surface temperature of the male mold plug 11 is preferably 70 to 120° C., especially preferably 80 to 100° C., and the cooling is preferably performed for a cooling time of one second or more.

Moreover, at this time, air may be supplied from the gas passage 121 of the female mold 12. In such case, shaping properties is further improved.

Thereafter, the mold is opened, the male mold plug 11 is raised, and the cup-like polyester container is taken out as a finally molded article.

[Second Embodiment]

Figure 18:
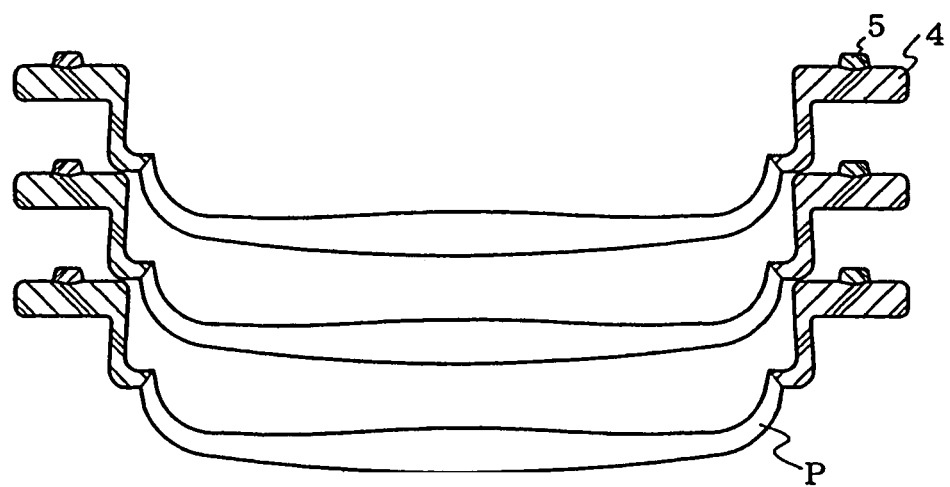
FIG. 18 is a reference diagram of a preform for use in a second embodiment of the method for manufacturing the polyester container according to the present invention.

FIGS. 18 and 19 are diagrams showing a second embodiment of a method for manufacturing a polyester container according to the present invention.

In the present embodiment, prior to molding of the container, there is molded a molded article for container intermediate such as a preform P having a projecting portion 5 on a flange part 4 by injection molding or compression molding, and the flange part 4 is thermally crystallized. Moreover, the projecting portion 5 disposed on the upper surface of the flange part is subjected to an amorphous treatment or a low crystallization treatment.

Moreover, to dispose the amorphous or the lowly crystallized projecting portion on the upper surface of the crystallized flange part of the preform P, an undersurface of the flange part 4 is appressed against a heated mold, or the upper surface is heated with a far infrared heater or the like so as to obtain a resin temperature of 130 to 220° C. Moreover, the upper surface of the projecting portion 5, or the upper surfaces of the projecting portion 5 and the flange part 4 are cooled with a mold controlled at a temperature which is not more than a glass transition point (Tg).

Furthermore, the amorphous treatment or the low crystallization treatment of the projecting portion 5 may be performed by quenching the projecting portion by a cooling board, cool air or the like after heating and melting the projecting portion with an infrared heater, a heat board, hot air or the like after the projecting portion 5 is thermally crystallized together with the flange part 4.

It is to be noted that an intermediate molded article such as the preform P is preferably formed into a shape including a stack stepped portion 7 from the viewpoint that fitting properties of the intermediate molded article or a cup-like final product are improved.

Furthermore, as shown in FIG. 18, in this case, the flange part 4 is preferably thermally crystallized from the flange part 4 up to the stack stepped portion 7 (a portion excluding a portion constituting a container trunk portion).

Next, as shown in FIG. 19(a), the preform P is heated at a draw molding temperature of Tg to (Tg+60° C.), preferably (Tg+15° C.) to (Tg+50° C.), and the preform is laid in a female mold 22 of a molding device for drawing blow molding.

Moreover, as shown in FIG. 19(b), the flange part and the projecting portion of the preform P are clamped by the female mold 22 and a clamp mold 23, and drawing blow molding is performed by supplying compressed air from a male mold plug 21 and a gas passage 211 of the plug. Moreover, the preform is appressed against the heated female mold 22 to perform heat setting, and the preform P is drawn, blown, and molded.

Thereafter, as shown in FIG. 19(c), when compressed air supplied from the gas passage 211 of the male mold plug 21 is stopped to self-contract the drawn portion 27, and the drawn portion is contracted up to the outer surface of the male mold plug 21, air is sucked via the gas passage 211 to evacuate between the drawn portion 27 and the male mold plug 21. The oriented portion 27 is shaped and cooled into an outer surface shape of the male mold plug 21, and a cup-like polyester container 1 is obtained.

It is to be noted that temperatures of the male mold plug 21, the female mold 22 and the like in the present embodiment are substantially similar to those of the first embodiment.

[Third Embodiment]

FIG. 20 is a diagram showing a third embodiment of a method for manufacturing a polyester container according to the present invention.

In the present embodiment, in the same manner as in the second embodiment, prior to molding of a container, a molded article for container intermediate such as a preform P having a projecting portion 5 on a flange part 4 is molded by injection molding or compression molding, the flange part 4 is thermally crystallized, and an amorphous treatment or a low crystallization treatment is performed on the projecting portion 5 disposed on an upper surface of the flange part.

Figure 20A:
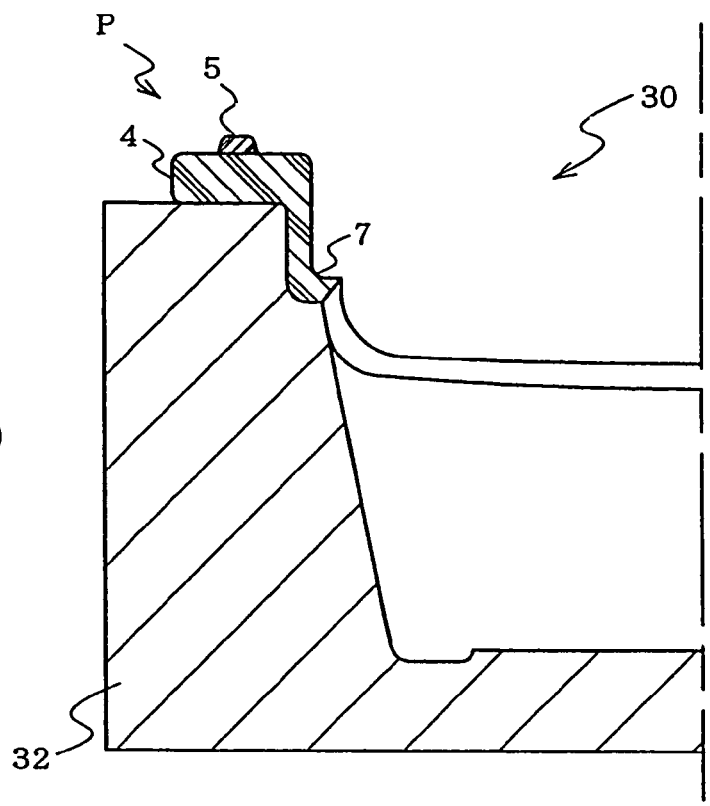
FIG. 20 is a diagram showing a third embodiment of the method for manufacturing the polyester container according to the present invention.

Moreover, as shown in FIG. 20(a), a portion excluding the flange part 4 and the projecting portion 5 of the preform P is heated at a draw molding temperature of Tg to (Tg+60° C.), preferably (Tg+15° C.) to (Tg+50° C.), and the preform is laid in a female mold 32 of a molding device 30 for matched molding.

Figure 20B:
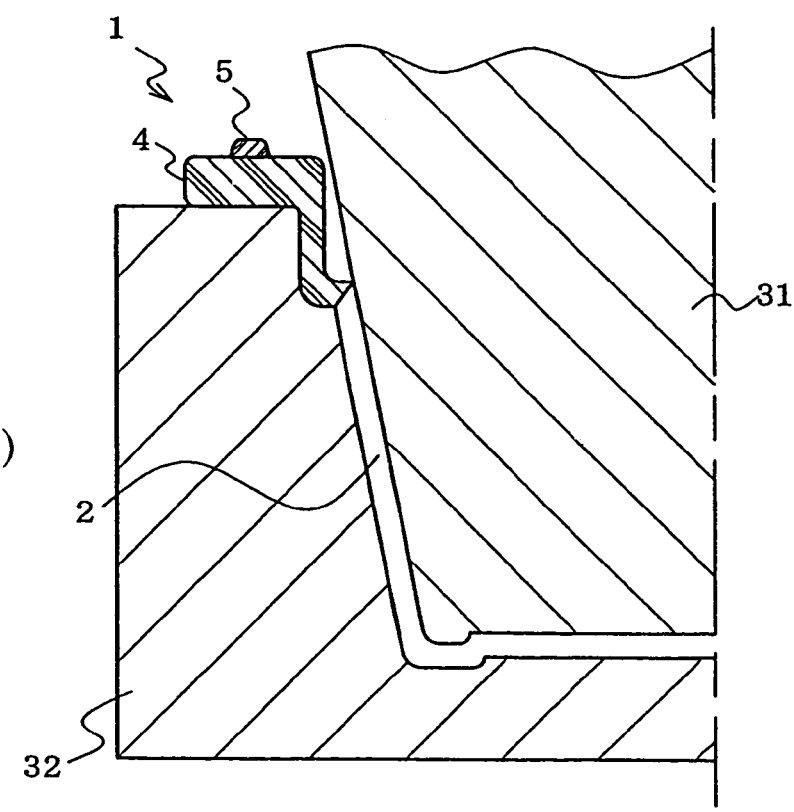

Next, as shown in FIG. 20(b), a male mold plug 31 is lowered to perform the matched molding, and a portion which becomes a trunk portion of the container is heated by the female mold 32 to carry out heat set, for example, the portion is heat set by the female mold 32 heated to 130 to 200° C., whereby a cup-like polyester container is obtained.

Figure 21A:
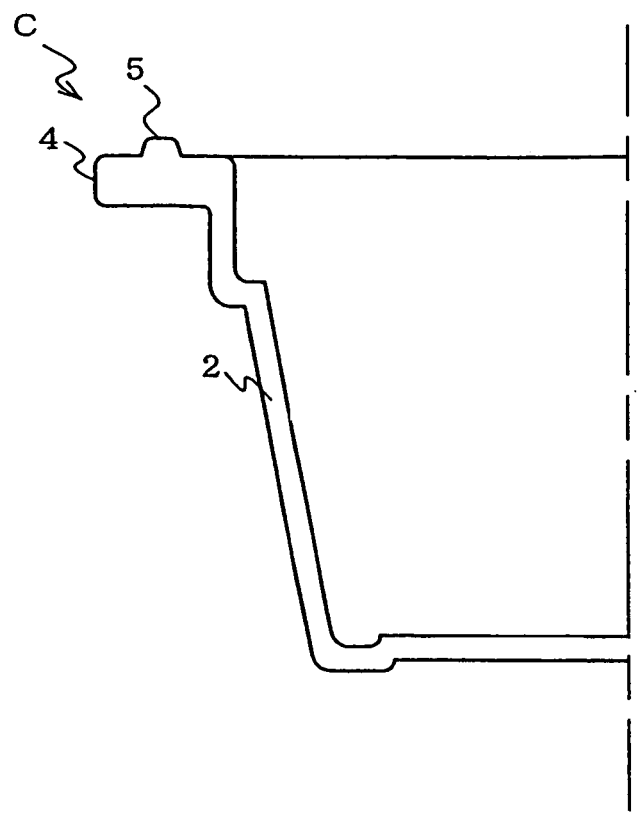
FIG. 21 is a diagram showing a modification in a third embodiment of the method for manufacturing the polyester container according to the present invention.
Figure 21B:
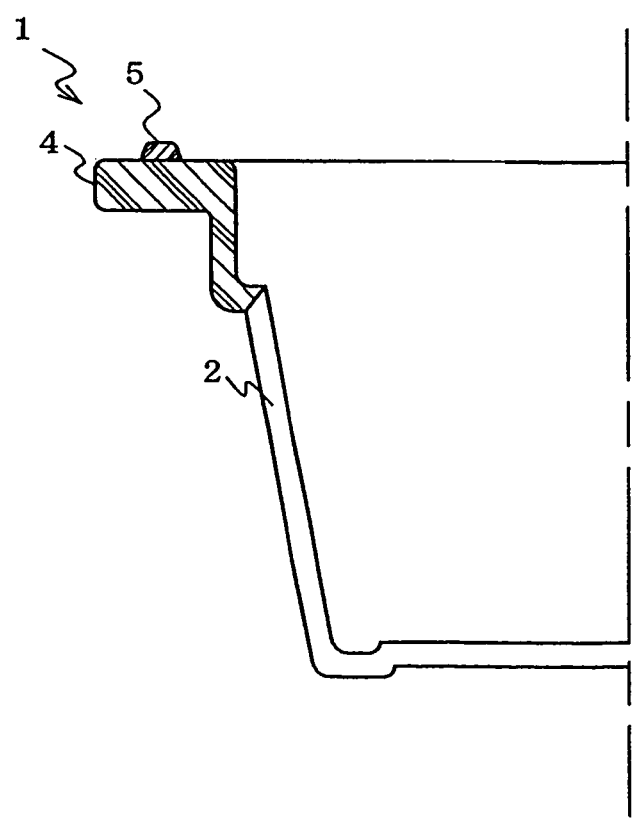

It is to be noted that in the present embodiment, as shown in FIG. 21(a), a container article C having a projecting portion 5 on a flange part 4 is molded by injection molding or compression molding. Next, as shown in FIG. 21(b), the flange part 4 is thermally crystallized by a method similar to the above-described method, an amorphous treatment or a low crystallization treatment is performed on the projecting portion 5 disposed on the upper surface of the flange part 4, and a polyester container 1 may be manufactured.

The method for manufacturing of the polyester container according to the present invention is not limited to the above embodiments, and various other molding methods may be used. Examples of a method of thermally molding a trunk portion 2 of a cup-like polyester container include known thermal molding methods such as blow molding, drawing blow molding (one-stage drawing blow, two-stage drawing blow), shrink-back molding, and vacuum/compressed air molding.

In the present invention, examples of a polyester for use as a material of the polyester container include a homopolyester such as polyethylene terephthalate; polyethylene/butylene terephthalate, polyethylene terephthalate/2,6-naphthalate, and polyethylene terephthalate/isophthalate; copolymer polyesters of them with polybutylene terephthalate, polybutylene terephthalate/isophthalate, polyethylene-2,6-naphthalate, polybutylene terephthalate/adipate, polyethylene-2,6-naphthalate/isophthalate, and polybutylene terephthalate/adipate; and a blend of two or more of them. Among them, the homopolymer of polyethylene terephthalate or the copolymer polyester whose melting point is 200° C. or more is preferable.

The polyester may contain at least one of refined resin components such as ethylene-based polymer, thermoplastic elastomer, polyarylate, and polycarbonate. In general, an amount of the refined resin components to be added is 50 parts by weight or less per 100 parts by weight of polyester, especially 5 to 35 parts by weight.

The polyester for use in the present invention may be blended with known agents for plastics such as an antioxidant, a thermostabilizer, an ultraviolet absorber, an antistatic additive, a filler, and a colorant. For the purpose of making a molded container opaque, it is possible to blend a filler such as an inorganic or an organic pigment such as calcium carbonate, calcium silicate, alumina, silica, a clay, a casting plaster, talc or magnesia; or an inorganic or an organic pigment such as titanium white, yellow ion oxide, colcothar, ultramarine blue or chromium oxide.

The container of the present invention may be a single-layer container constituted of a polyester single layer, or a multilayered container constituted of another resin layer such as a gas-barrier resin, a recycled polyester resin, or an oxygen-absorptive resin.

In the multilayered container, the other resin layer may be constituted of two layers and used as an outer layer, or may be constituted of three or more layers and used as an intermediate layer.

As the gas-barrier resin, a known arbitrary resin may be used such as an ethylene-vinyl alcohol copolymer (EVOH), a nylon resin (Ny), a gas-barrier polyester resin (BPR), or an annular olefin-based copolymer.

As the recycled polyester (PCR), a particulate or powdered polyester is used which is obtained by recovering a used polyester container, removing foreign matters, and cleaning and drying the material.

The recycled polyester can be used alone or a blend with a virgin polyester. In a case where the recycled polyester has a lowered inherent viscosity, the recycled polyester is preferably used as the blend with the virgin polyester. In this case, a blend ratio of recycled polyester:virgin polyester is preferably a weight ratio of 9:1 to 2:8.

This recycled polyester (PCR) layer may be used in a multilayered structure of three or more layers in which the recycled polyester layer is sandwiched between virgin polyester layers.

As another resin layer of the multilayered container, the oxygen absorptive resin can be used.

As the oxygen absorptive resin, there is used a resin containing a metal-based oxide catalyst and an oxidative organic component.

The oxidative organic component is a resin which is oxidized by a catalytic function of a transition-metal-based catalyst, and examples of the oxidative organic component to be used include (i) a resin containing a carbon side chain (a) and containing, in a main or a side chain, at least one functional group (b) selected from the group consisting of a carboxylic acid group, a carboxylic anhydride group, a carboxylate group, a carboxylic amide group, and a carbonyl group, (ii) a polyamide resin, (iii) a copolymer containing an ethylene-based unsaturated group or the like.

As the transition-metal-based catalyst, a metal component of the group VIII of the periodic table such as iron, cobalt or nickel is preferable, but examples of the other transition-metal-based catalysts include metals of the group I such as copper and silver; metal components of the group IV such as tin, titanium and zirconium; a component of the group V such as vanadium; a metal component of the group VI such as chromium; and a metal component of the group VII such as manganese. Among these metal components, the cobalt component is especially preferable because it has a high oxygen absorbing speed.

The transition-metal-based catalyst is generally used in the form of a small-valence inorganic or organic acid salt or complex salt of the above-described transition metal, and may be used in an amount of 100 to 1000 ppm per resin.

Moreover, in the multilayered container, in a case where there is not any thermal bonding properties between the above polyester resin layer and another resin layer such as the gas-barrier resin or the oxygen absorptive resin, an adhesive resin layer may intervene between the opposite resin layers.

There is not any special restriction on the adhesive resin, but there may be used an acid modified olefin based resin such as maleic anhydride graft polyester or maleic anhydride graft polypropylene.

In the present invention, a cover member for use in the polyester container is formed of a known container forming material such as a resin, a metal, or a laminate of them. There may be applied a laminate manufactured by a known arbitrary method such as dry lamination, sandwich lamination, extrusion lamination, or thermal lamination from a thermoplastic resin film such as a biaxially oriented polyethylene terephthalate film or a biaxially oriented nylon film; any type of sheet base material; a metal foil such as an aluminum foil, a tin foil, a copper foil, or a tin-plate foil; or any type of gas-barrier resin or sheet such as an ethylene-vinyl alcohol copolymer (EVOH), a nylon resin (Ny), a gas-barrier polyester resin (BPR), or an annular olefin based copolymer.

However, among them, the cover member preferably has a sealant layer made of a polyester resin whose melting point is 110 to 225° C. It is especially preferable to use a polybutylene-terephthalate (PBT)-based resin whose glass transition point (Tg) is −75 to 30° C. and whose melting point is 120 to 200° C. because a crystallization speed is high, a solidification speed is increased after the heat sealing, both the appropriate heat resistance and low-temperature heat sealability are established, and the bite sealability or the like is excellent.

The polybutylene-terephthalate (PBT)-based resin is a polyester obtained by polycondensation of 1,4-butanediol and terephthalic acid or lower alcohol ester. In addition to a homopolymer, the resin includes a copolyester obtained by replacing a part of terephthalic acid with one or more components of bifunctional or multifunctional carboxylic acid and/or replacing a part of 1,4-butanediol with one or more bifunctional or multifunctional alcohol components. Examples of the bifunctional or multifunctional carboxylic acid include isophthalic acid, orthophthalic acid, 2,6-naphthalene dicarboxylic acid, paraphenylene dicarboxylic acid, 1,4-cyclohexane dicarboxylic acid, succinic acid, glutaric acid, adipic acid, suberic acid, azelaic acid, sebacic acid, dodecanedionic acid, trimellitic acid, and pyromellitic acid.

Moreover, examples of the bifunctional or multifunctional alcohol include 1,2-propylene glycol, 1,5-pendane diol, 1,6-hexane diol, neopentyl glycol, diethylene glycol, triethylene glycol, polyethylene glycol, polytrimethylene glycol, polytetramethylene glycol, 1,4-dichlohexane methanol, trimethylol propane, and pentaerythritol.

The polybutylene-terephthalate (PBT)-based resin may be blended with at least one of another polyester resin, ethylene-based copolymer, thermoplastic elastomer, polyarylate, and polycarbonate as the refined resin component, for example, for a purpose of imparting easy-peelability. In general, these refined resin components are preferably used up to 60 parts by weight per 100 parts by weight of the polybutylene-terephthalate (PBT)-based resin, preferably by an amount of 3 to 20 parts by weight.

In the present invention, a polybutylene-terephthalate-based resin film for use can be formed into single layer or multiple layers by a known film forming method such as an inflation method, a casting method, or an extrusion coating method by use of an appropriately selected resin of the group IV suitable for each molding method. In respect of stability of film formation, for example, 1.2 parts by weight or more of resin are preferable in the inflation method, 1.0 to 1.4 parts by weight of resin are preferable in the casting method, and 0.8 to 1.2 parts by weight of resin of the group IV is preferable in the extrusion coating method.

As to the polybutylene-terephthalate-based resin, 3 to 20 parts by weight of an ethylene-based copolymer can be added to the polybutylene-terephthalate-based resin for a purpose of improving film formability. This effectively works in reducing neck-in in, for example, the casting method or the extrusion coating method. For example, in a case where sticking properties of a straw or the like are imparted to the cover member, or the cover member is peeled and opened, the thickness of the film is set to, for example, 40 μm or less, more preferably 30 μm or less. Moreover, 1.0 part by weight or less of the resin of the group IV is preferable. In this case, problems in forming the film can be largely improved such as an excessive neck-in, wavy edges, and meandering generated in the casting method or the extrusion coating method.

Examples of the ethylene-based copolymer for the purpose of improving the film formability include polyethylenes having a low, a medium and a high density; flocculent low-density polyethylene; flocculent super-low-density polyethylene; ethylene-propylene copolymer; ethylene-butene-1 copolymer; ethylene-propylene-butene-1 copolymer; ethylene-vinyl acetate copolymer; ion bridge olefin copolymer (ionomer); ethylene-acrylic ester copolymer; ethylene-acrylic acid copolymer; ethylene-methacrylic acid copolymer; ethylene-maleic acid copolymer; ethylene-itaconic acid copolymer; ethylene-maleic anhydride copolymer; ethylene-maleic acid monomethyl ester copolymer; and ethylene-maleic acid monoethyl ester copolymer. As ionic species of the ionomer, Na, K, Zn or the like is used.

Among them, a copolymer having a polarity group in a molecular chain is preferable such as ethylene-methacrylic acid or the ionomer in that the copolymer is easily dispersed in the polybutylene-terephthalate-based resin. A quantity of an acid component in the copolymer is preferably 12% by weight or less, especially preferably 6% by weight or less in respect of odor.

The polybutylene-terephthalate (PBT)-based resin can be blended with a known compound agent for plastic such as antioxidant, thermostabilizer, ultraviolet absorber, antistatic additive, filler, lubricant, or inorganic or organic colorant.

The thickness of the polybutylene-terephthalate (PBT)-based resin is preferably 3 to 50 μm in respect of stable sealing performance and electric heating properties. Multilayering is preferable in order to prevent squeeze during the heat sealing. The sealant layer is disposed in a thickness of 3 to 20 μm, and a polyester-based resin having a melting point of 200° C. or more is disposed in an adjacent layer in a thickness of 10 to 30 μm by a co-extrusion method or the like.

EXAMPLE

1. Measurement of Crystallinity
(1) Measurement of crystallinity of flange part and projecting portion The crystallinity was calculated from the following equation by a density method:

$$Xcv = (\rho_c(\rho - \rho_a))/(\rho(\rho_c - \rho_a)),$$

Xcv: crystallinity (%) of a measurement resin sample;
ρ: density (g/cm³) of the measurement resin sample;
$\rho_a$: density (g/cm³) of a completely amorphous resin; and
$\rho_c$: density (g/cm³) of a completely crystalline resin.

In the present invention, the calculation was performed with $\rho_a = 1.335$ and $\rho_c = 1.455$ generally used in the polyester resin.

In the present invention, a density of a portion having a small density distribution or the like in the flange part or the projecting portion of the polyester container was calculated from the following equation using a laser raman spectrophotometry device:

$$\rho = (\Delta v_{1/2} - k_1)/k_2,$$

$\Delta v_{1/2}$: half-value width (cm⁻¹) of a peak appearing in a wavelength of 1730 cm⁻¹ in a laser raman spectrum;
$k_1$: cut piece obtained from a working curve in which the ordinate indicates the half-value width and the abscissa indicates the density; and
$k_2$: gradient obtained from the working curve in which the ordinate indicates the half-value width and the abscissa indicates the density.

(2) Ratio of Lowly Crystallized Region of Flange Part

A crystallinity distribution of a section of a flange part (4) was measured, and assuming that a crystallized portion having a crystallinity of 20% or more was (a), and an amorphous region or a lowly crystallized region having a crystallinity of less than 20% was (b), there was obtained a ratio of the amorphous region or the lowly crystallized region (b) in the flange part 4 defined by the following equation (FIG. 2):

ratio (%) of lowly crystallized region (b) = (b)/[(a) + (b)] × 100.

2. Evaluation

A cup-like polyester container was filled with distilled water at 60° C. so as to obtain a head space of 30 cc, a cover member was pressurized twice for one second on conditions of an axial weight of 980 N by use of a flat sealing head at 230° C., and heat-sealing with the cover member was carried out in a bitten state where water was applied to the flange part to obtain a sample for evaluation Furthermore, the sealed cup-like polyester container was submerged in hot water at 80° C. for 30 minutes while the flange part was disposed on the downside, and presence of deformation of the flange part and presence of a sealing defect were visually evaluated.

3. Cover Member

Four types of sealing materials were formed into films with a casting machine, and they were dry-laminated using an urethane-based adhesive to prepare a cover member including a three-layer constitution constituted of a 9 μm biaxially oriented PET film (BO-PET)/a 15 μm aluminum foil (AL foil)/a 30 μm sealant layer from an outer layer side as shown in Table 1.

After the resultant cover members were submerged in a hydrogen peroxide solution at 65° C. for ten seconds, the members were dried with hot air, and used in examples and comparative examples, respectively.

It is to be noted that as to cover member 1, a support layer was formed on a sealant layer.

TABLE 1

| | | | Sealant layer | | | | |
| | | | Support layer | | Sealant layer | | |
| | Outer layer | Barrier layer | Resin | Melting point | Resin | Melting point | Tg |
|---|---|---|---|---|---|---|---|
| Cover member 1 | BO-PET | Al foil | Resin B | 223° C. | Resin A | 170° C. | 27° C. |
| Cover member 2 | BO-PET | Al foil | | None | Resin B | 223° C. | 35° C. |
| Cover member 3 | BO-PET | Al foil | | None | Resin A | 170° C. | 27° C. |
| Cover member 4 | BO-PET | Al foil | | None | Resin C | 123° C. | −70° C. |

*Sealant layer resin
Resin A: Polybutylene terephthalate/isophthalate
Resin B: Polybutylene terephthalate
Resin C: Polybutylene terephthalate/isophthalate Containing polyether glycol as a diol component
*Cover member 1: a support layer was formed in which 5 parts by weight of ethylene methacrylic acid copolymer (EMAA) [Nucrel AN4228C manufactured by Mitsui Dupont Co.] were added to the resin B in order to improve film formability.

Example 1

The following heat-resistant cup-like polyester container having a lowly crystallized portion in a flange part was molded by a method of the above-described first embodiment by use of a 1.8 mm thick amorphous polyethylene terephthalate sheet produced on trial with homopolyethylene terephthalate (NEH2040H manufactured by Unitika Ltd.) whose glass transition temperature (Tg) was 73° C. as a polyester resin sheet, where there were set a sheet temperature of 95° C., a male mold plug temperature of 90° C., a female mold temperature of 180° C., and a clamp mold temperature of 90° C.

[Shape of Cup-like Polyester Container]
Cup height: 106 mm
Flange part inner diameter: 61 mm
Flange part outer diameter: 71 mm Bottom diameter: 47 mm
Shape of projecting portion: FIG. 4(a)
Height of projecting portion: 0.25 mm
Width of projecting portion: 1.8 mm For the resultant cup-like polyester container, the cover member 1 in Table 1 was used as the cover member, and evaluation was then made. Results are shown in Table 2.

Example 2

A cup-like polyester container was molded and then heat-sealed with a cover member in the same manner as in Example 1 except that a height of a projecting portion was set to 0.1 mm and the cover member 2 in Table 1 was used as the cover member, and evaluation was made.

Example 3

A cup-like polyester container was molded and then heat-sealed with a cover member in the same manner as in Example 1 except that a height of a projecting portion was set to 0.3 mm and the cover member 6 in Table 1 was used as the cover member, and evaluation was made.

Example 4

A cup-like polyester container was molded in a method similar to Example 1 except that a preform having a flange part was molded by injection molding and heated at 95° C.

The resultant cup-like polyester container was heat-sealed with a cover member 4 in Table 1 in the same manner as in Example 1, and evaluation was made.

Example 5

After melting and extruding a polyethylene terephthalate resin, a molten cluster of the resin cut into a certain dimension was compressed and molded to prepare an amorphous preform having a flange part 4 having a thickness of 2 mm and a projecting portion 5 having a height of 0.5 mm and a width of 2.5 mm as shown in FIG. 4(b).

Figure 3A:
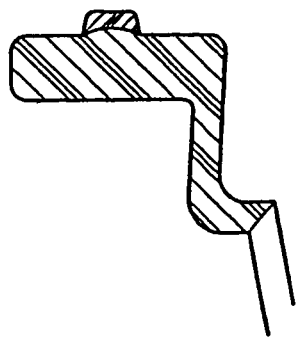
FIG. 3 is a diagram showing a crystallization state of the flange part, and an amorphous state or a low crystallization state of the projecting portion.
Figure 3B:
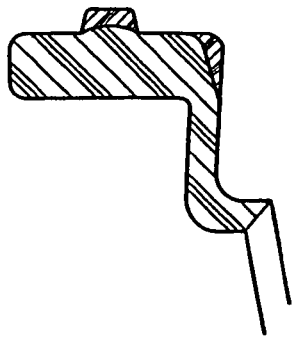
Figure 3C:
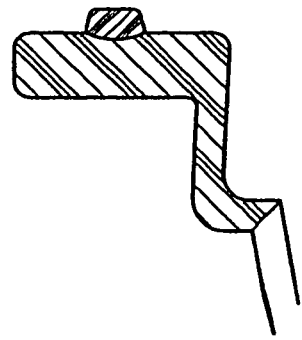
Figure 3D:
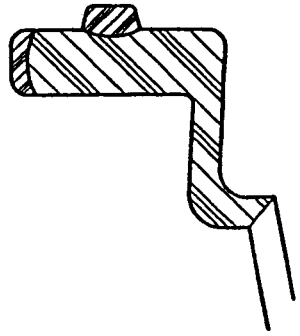
Figure 3E:
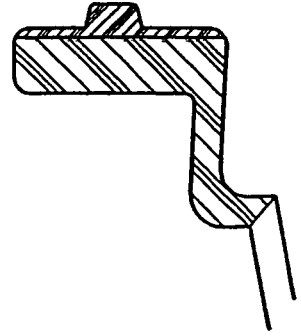
Figure 3F:
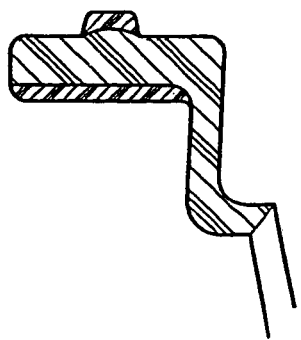

Next, while cooling an upper surface of the flange part and the projecting portion of this preform in a mold, a side face and an undersurface of the flange part were heated with a heater to prepare a preform which had an amorphous state or a low crystallization state in the upper surface of the flange part, the projecting portion, and the vicinity of the portion shown in FIG. 3(e) and in which a main portion of the flange part was thermally crystallized.

Furthermore, a portion of this preform excluding the flange part and the projecting portion was heated at 105° C. with an infrared heater, and there was molded a cup-like polyester container having heat resistance and having a dimension similar to that of Example 1 was molded by a method (drawing blow molding) of the second embodiment shown in FIG. 19.

The resultant cup-like polyester container was heat-sealed with a cover member in the same manner as in Example 1, and evaluation was made.

Example 6

A cup-like polyester container was heat-sealed with a cover member in the same manner as in Example 5 except that the container was obtained from a preform by the method (matched molding) of the third embodiment shown in FIG. 20, and evaluation was made.

Comparative Example 1

A cup-like polyester container was heat-sealed with a cover member in the same manner as in Example 1 except that a temperature of a female mold was set at 50° C., a flange part was not thermally crystallized, and a height of the protrusion was set to 0.5 mm. Then, evaluation was made.

Comparative Example 2

A cup-like polyester container was heat-sealed with a cover member in the same manner as in Example 1 except that any projecting portion was not disposed on an upper surface of a flange part of the cup-like polyester container, and evaluation was made.

Comparative Example 3

A cup-like polyester container was molded and then heat-sealed with a cover member in the same manner as in Example 5 except that a step of heating a flange part with a heater to thermally crystallize the part was omitted from Example 5 and a portion of a blow molding mold in contact with the flange part was cooled with cooling water in order to maintain the whole flange part in an amorphous state or a lowly crystallization state. Afterward, evaluation was made.

Comparative Example 4

A cup-like polyester container was molded and then heat-sealed with a cover member in the same manner as in Example 5 except that the whole flange part was thermally crystallized by heating with a heater. Afterward, evaluation was made.

Comparative Example 5

A cup-like polyester container was molded and then heat-sealed with the cover member 1 in the same manner as in Example 5 except that a ratio of a lowly crystallized region was set to 70%, and evaluation was made.

As a result of evaluation, in Examples 1 to 6, sealing strengths were excellent, and there were not generated foaming during bite sealing, deformation of the flange part during the heat sealing, or peeling of the cover member during heating in hot water.

On the other hand, in Comparative Examples 1 to 5, there occurred any of phenomena such as degradation of the sealing strength, the foaming during the bite sealing, the deformation of the flange part during the heat sealing, and the peeling of the cover member during the heating in hot water.

These results are shown in Table 2.

TABLE 2

| | Constitutions of flange part and projecting portion | | | | | Evaluation results | | | | |
|---|---|---|---|---|---|---|---|---|---|---|
| | Crystallinity (%) of flange part | Ratio (%) of lowly crystallized portion (b) of flange part | Crystallinity (%) of projecting portion seal face | Projecting portion shape | Projecting portion height (mm) | Sealing strength (N/15 mm) | Foaming during bite sealing | Deformation of flange part during sealing | Deformation of flange part during heating in hot water | Cover member peeling during heating in hot water |
| Example 1 | 25 | 30 | 5 | FIG. 4(a) | 0.25 | 20 or more | None | None | None | None |
| Example 2 | 25 | 24 | 7 | FIG. 4(a) | 0.1 | 20 or more | None | None | None | None |
| Example 3 | 25 | 60 | 5 | FIG. 4(a) | 0.3 | 20 or more | None | None | None | None |
| Example 4 | 25 | 30 | 5 | FIG. 4(a) | 0.25 | 20 or more | None | None | None | None |
| Example 5 | 30 | 60 | 3 | FIG. 4(b) | 0.5 | 20 or more | None | None | None | None |
| Example 6 | 30 | 60 | 3 | FIG. 4(b) | 0.5 | 20 or more | None | None | None | None |
| Comparative Example 1 | — | 100 | 5 | FIG. 4(a) | 0.5 | 20 or more | None | Present | Present | None |
| Comparative Example 2 | 25 | 0 | — | None | 0 | 10 or less | Present | None | None | Present |
| Comparative Example 3 | — | 100 | 3 | FIG. 4(b) | 0.5 | 20 or more | None | Present | Present | None |
| Comparative Example 4 | 30 | 0 | 30 | FIG. 4(b) | 0.5 | 10 or less | None | None | None | Present |
| Comparative Example 5 | 30 | 70 | 3 | FIG. 4(b) | 0.5 | 20 or more | None | None | Present | None |

The preferable embodiments of the present invention have been described above, but the present invention is not limited to the above-described embodiments only and, needless to say, various modifications are possible in the scope of the present invention, such as a molded article constituted of a sheet, a molded article by injection molding or compression molding, and molded articles obtained by thermally molding these molded articles as performs.

Moreover, in the above-described embodiments, a cup-like container shape has been described as an example, but the present invention is applicable to a container having another shape such as a tray shape, a bottle shape, or a tubular shape.

Furthermore, in the above-described embodiments, a container whose opening rim part includes a flange part for heat sealing has been described as an example, but the present invention is applicable to a container whose opening rim part is not provided with any flange part That is, there is not any special restriction on the shape of the container as long as rigidity is imparted to the opening rim part which is heat-sealed with a cover member, and heat sealing strength as well as a low-temperature heat sealability can be improved regardless of whether or not the opening rim part of the container is not provided with any flange part.

Figure 22:
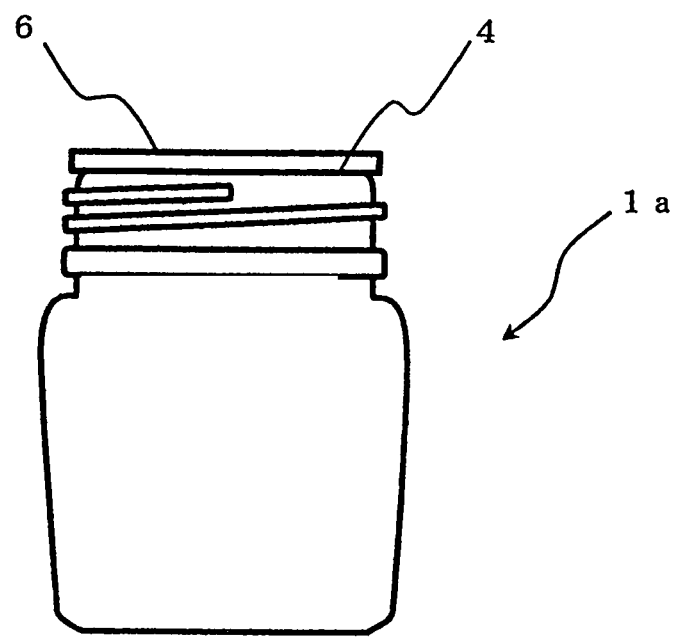
FIG. 22 is a diagram showing another example of the polyester container.

Specifically, the present invention can be applied also to a wide-mouthed bottle 1a shown in FIG. 22. In the wide-mouthed bottle 1a shown in FIG. 22, an upper surface of an opening rim part 4 is heat-sealed with an inner seal member 6 as an inner cover, and the bottle is further constituted so that a cover member (not shown) is screwed into an opening.

The present invention can be applied even to such wide-mouthed bottle 1a to impart rigidity to the opening rim part 4 which is heat-sealed with the inner seal member 6. The low-temperature heat sealability as well as the heat sealing strength can be improved.

Figure 23A:
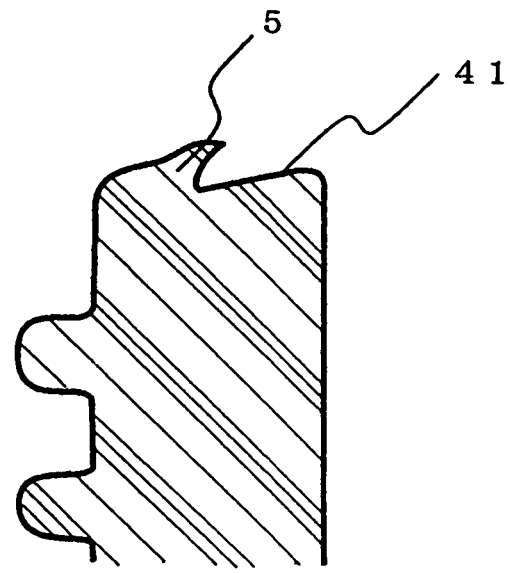
FIG. 23 is a sectional view showing a sectional shape of an opening rim part in another example of the polyester container.
Figure 23B:
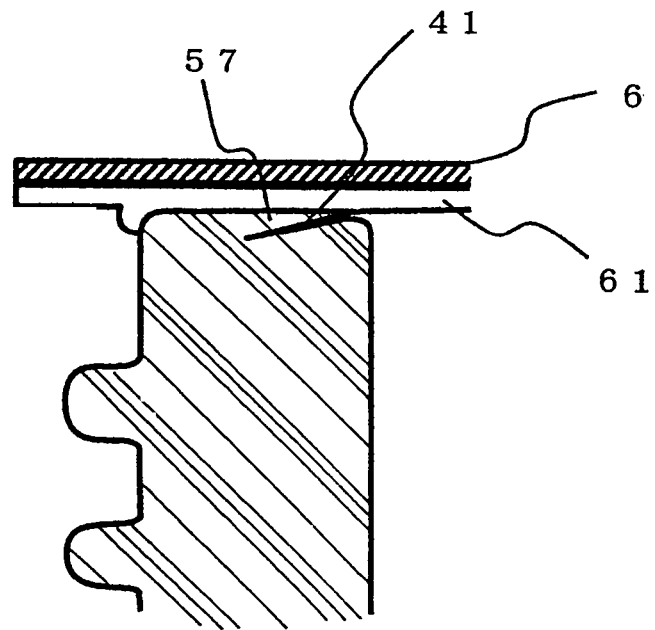

Furthermore, as shown in, for example, FIG. 23(a), a projecting portion 5 is formed beforehand on an upper surface 41 of the opening rim part 4 of the wide-mouthed bottle 1a, and the projecting portion 5 is deformed in a case where the upper surface 41 of the opening rim part 4 is heat-sealed with the inner seal member 6. As shown in FIG. 23(b), a resin piece 57 is formed so as to protrude toward the interior of the container in a state where the resin piece 57 is appressed against the upper surface 41 of the opening rim part 4. This resin piece 57 is bonded to a sealant layer 61 of the inner seal member 6. Accordingly, the unevenness of the sealing strength can be suppressed.

It is to be noted that in the example shown in FIG. 23(a), the projecting portion 5 is inclined toward the interior of the container so that the resin piece 57 is easily formed in the container. Such configuration can be formed by injection molding or compression molding, or formed by subjecting the upper surface 41 of the opening rim part to post-processing such as pressing a heated non-viscous jig.

Additionally, the present invention can be similarly applied to a bottle, a tube, or a spout-attached pouch whose opening is sealed with a heat seal lid or an inner seal member.

INDUSTRIAL APPLICABILITY

A polyester container of the present invention can be utilized as a container of food, beverage, drugs or the like, especially as a heat-resistant polyester container in any type of field.

The invention claimed is:

1. A polyester container, comprising:
a trunk portion;
a flange integrally formed with the trunk portion and having a flat upper surface; and a heat sealing structure integrally formed with the flange and adapted to form a hermetic heat seal between the container and a cover member, the heat sealing structure comprising a projecting portion projecting from the flat upper surface of the flange, wherein the projecting portion is formed at a center or an outer peripheral side of the flat upper surface relative to a width direction of the flat upper surface so that at least a portion of the projecting portion which becomes a heat-sealing-face of the heat seal comprises an amorphous portion or a lowly crystallized portion, and which has a crystallinity lower than that of a rest of the flange except for the at least the portion of the projecting portion which becomes the heat-sealing-face.

2. The polyester container according to claim 1, wherein the flange comprises a first crystallized region forming said at least portion of the projecting portion, and a second crystallized region forming the rest of the flange, a crystallinity of the second crystallized region is 20% or more, and a crystallinity of the first crystallized region is in a range of 0 to less than 20%.

3. The polyester container according to claim 1, wherein a thickness of the projecting portion is in a range of 0.1 to 2.0 mm.

4. The polyester container according to claim 1, wherein the container is a cup-like container, and at least the trunk portion of the container is orientationally or thermally crystallized.

5. The polyester container according to claim 1, wherein the upper surface of the flange has a tapered face inclined obliquely upwards from a base portion of the projecting portion to an interior of the container.

6. The polyester container according to claim 1, further comprising a cover member having a sealant layer made of a polyester resin with a melting point of 110° C. to 225° C.

7. The polyester container according to claim 6, wherein the sealant layer is made of a polybutylene-terephthalate-based resin.

\* \* \* \* \*